United States Patent
Brothers et al.

(10) Patent No.: US 11,440,981 B2
(45) Date of Patent: *Sep. 13, 2022

(54) AQUEOUS POLYMERIZATION OF FLUORINATED MONOMER USING POLYMERIZATION AGENT COMPRISING FLUOROPOLYETHER ACID OR SALT AND SHORT CHAIN FLUOROSURFACTANT

(71) Applicant: THE CHEMOURS COMPANY FC LLC, Wilmington, DE (US)

(72) Inventors: Paul Douglas Brothers, Chadds Ford, PA (US); Subhash Vishnu Gangal, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,317

(22) Filed: Aug. 13, 2013

(65) Prior Publication Data
US 2013/0331516 A1 Dec. 12, 2013

Related U.S. Application Data

(60) Continuation of application No. 13/313,271, filed on Dec. 7, 2011, now abandoned, which is a continuation of application No. 12/712,278, filed on Feb. 25, 2010, now abandoned, which is a division of application No. 11/937,544, filed on Nov. 9, 2007, now Pat. No. 7,705,074.

(60) Provisional application No. 60/857,960, filed on Nov. 9, 2006, provisional application No. 60/858,010, filed on Nov. 9, 2006.

(51) Int. Cl.
| | |
|---|---|
| C08F 14/26 | (2006.01) |
| C08F 14/18 | (2006.01) |
| C08F 214/26 | (2006.01) |
| C08K 3/20 | (2006.01) |
| C08L 27/18 | (2006.01) |

(52) U.S. Cl.
CPC .............. *C08F 14/26* (2013.01); *C08F 14/18* (2013.01); *C08F 214/262* (2013.01); *C08K 3/20* (2013.01); *C08L 27/18* (2013.01); *C08L 2201/54* (2013.01)

(58) Field of Classification Search
USPC ......................................................... 526/225
See application file for complete search history.

(56) References Cited

U.S. PATENT DOCUMENTS

| | | | |
|---|---|---|---|
| 2,559,752 A | 7/1951 | Berry | |
| 2,713,593 A | 7/1955 | Brice et al. | |
| 3,083,220 A * | 3/1963 | William | 558/54 |
| 3,271,341 A | 9/1966 | Garrison, Jr. | |
| 3,282,875 A | 11/1966 | Connolly et al. | |
| 3,291,843 A | 12/1966 | Fritz et al. | |
| 3,391,099 A | 7/1968 | Punderson | |
| 3,839,425 A | 10/1974 | Bartlett | |
| 4,029,868 A * | 6/1977 | Carlson | 526/247 |
| 4,036,802 A | 7/1977 | Poirier | |
| 4,358,545 A | 11/1982 | Ezzell et al. | |
| 4,380,618 A | 4/1983 | Khan et al. | |
| 4,381,384 A | 4/1983 | Khan | |
| 4,384,092 A * | 5/1983 | Blaise et al. | 526/225 |
| 4,463,144 A | 7/1984 | Kojima et al. | |
| 4,552,631 A | 11/1985 | Bissot et al. | |
| 4,621,116 A | 11/1986 | Morgan | |
| 4,723,016 A | 2/1988 | Chenard et al. | |

(Continued)

FOREIGN PATENT DOCUMENTS

| | | |
|---|---|---|
| EP | 0148482 B1 | 7/1985 |
| EP | 0250767 A1 | 1/1988 |

(Continued)

OTHER PUBLICATIONS

Kasai, "Perfluoropolyethers With Acid End Groups: Amphiphilicity and Emulsification", Journal of Applied Science, vol. 57, 1995, pp. 797-809.
PCT International Search Report and Written Opinion for International Application No. PCT/US2007/023639 dated Mar. 12, 2008.
Hill, "Silicone Surfactants", Marcel Dekker Inc., ISBNO-8247-00104, pp. 5-6, 1999.
Distasio, ed., Surfactants, Detergents, and Sequestrants: Developments Since 1979, Noyes Data Corp., Park Ridge NJ, pp. vi-xiii, 1981.

(Continued)

*Primary Examiner* — Nicole M. Buie-Hatcher
(74) *Attorney, Agent, or Firm* — McNees Wallace & Nurick LLC

(57) ABSTRACT

A process comprising polymerizing at least one fluorinated monomer in an aqueous medium containing initiator and polymerization agent to form an aqueous dispersion of particles of fluoropolymer, the polymerization agent comprising:

fluoropolyether acid or salt thereof having a number average molecular weight of at least about 800 g/mol; and fluorosurfactant having the formula:

[R$^1$—O$_n$-L-A$^-$]Y$^+$ wherein:

R$^1$ is a linear or branched partially or fully fluorinated aliphatic group which may contain ether linkages;

n is 0 or 1;

L is a linear or branched alkylene group which may be nonfluorinated, partially fluorinated or fully fluorinated and which may contain ether linkages;

A$^-$ is an anionic group selected from the group consisting of carboxylate, sulfonate, sulfonamide anion, and phosphonate; and Y$^+$ is hydrogen, ammonium or alkali metal cation;

with the proviso that the chain length of R$^1$—O$_n$-L- is not greater than 6 atoms.

41 Claims, No Drawings

(56) References Cited

U.S. PATENT DOCUMENTS

| | | | |
|---|---|---|---|
| 4,743,658 A | 5/1988 | Imbalzano et al. | |
| 4,789,717 A | 12/1988 | Giannetti et al. | |
| 4,864,006 A | 9/1989 | Giannetti et al. | |
| 5,285,002 A | 2/1994 | Grootaert | |
| 5,637,748 A | 6/1997 | Hung et al. | |
| 5,688,884 A | 11/1997 | Baker et al. | |
| 5,763,552 A | 6/1998 | Feiring et al. | |
| 5,789,508 A | 8/1998 | Baker et al. | |
| 5,925,705 A | 7/1999 | Araki et al. | |
| 5,959,026 A | 9/1999 | Abusleme et al. | |
| 6,177,196 B1 | 1/2001 | Brothers et al. | |
| 6,300,445 B1 | 10/2001 | Hung et al. | |
| 6,395,848 B1 | 5/2002 | Morgan et al. | |
| 6,429,258 B1 | 8/2002 | Morgan et al. | |
| 6,465,577 B2 | 10/2002 | Okanishi et al. | |
| 6,841,616 B2 | 1/2005 | Wille et al. | |
| 6,869,997 B2 | 3/2005 | Wille et al. | |
| 6,878,772 B2 | 4/2005 | Visca et al. | |
| 7,141,537 B2 | 11/2006 | Audenaert et al. | |
| 7,705,074 B2 * | 4/2010 | Brothers et al. | 524/131 |
| 8,148,573 B2 | 4/2012 | Murai et al. | |
| 8,198,480 B2 | 6/2012 | Morita et al. | |
| 8,519,072 B2 * | 8/2013 | Brothers et al. | 526/214 |
| 2004/0072977 A1 | 4/2004 | Kaulbach et al. | |
| 2005/0090613 A1 | 4/2005 | Maruya et al. | |
| 2006/0166007 A1 | 7/2006 | Kent et al. | |
| 2006/0281946 A1 | 12/2006 | Morita et al. | |
| 2007/0015864 A1 | 1/2007 | Hintzer et al. | |
| 2007/0015865 A1 | 1/2007 | Hintzer et al. | |
| 2007/0015866 A1 | 1/2007 | Hintzer et al. | |
| 2007/0015937 A1 | 1/2007 | Hintzer et al. | |
| 2007/0142541 A1 | 6/2007 | Hintzer et al. | |
| 2008/0004392 A1 * | 1/2008 | Qiu | C09D 129/04 524/487 |

FOREIGN PATENT DOCUMENTS

| | | | |
|---|---|---|---|
| EP | 0315078 A2 | | 5/1989 |
| EP | 1334996 A2 | | 8/2003 |
| EP | 1679352 A2 | | 7/2006 |
| GB | 836741 | * | 6/1960 |
| GB | 1292268 | | 10/1972 |
| JP | 2004358397 A | | 12/2004 |
| JP | 2004359870 A | | 12/2004 |
| JP | 3900883 B2 | | 4/2007 |
| WO | 9937720 | | 7/1999 |
| WO | 0146116 A1 | | 6/2001 |
| WO | 0230848 A1 | | 4/2002 |
| WO | 2007046345 A1 | | 4/2007 |
| WO | 2007046377 A1 | | 4/2007 |
| WO | 2007046482 A1 | | 4/2007 |
| WO | 2007049517 A1 | | 4/2007 |

OTHER PUBLICATIONS

Ebnesajjad, "Chapter 7: Polymerization Surfactants" in Fluoroplastics, vol. 1: Non-Melt Processible Fluoropolymer—The Definitive User's Guide and Data Book, 2nd edn.; Elsevier Inc.: Waltham, MA, 2015.

Gutcho, Surfactants and Sequestrants: Recent Advances, Noyes Data Corp., Park Ridge, NJ, pp. vi-xi, 1977.

Hercules et al., "Preparation of tetrafluoroethylene from the pyrolysis of pentafluoropropionate salts", Journal of Fluorine Chemistry, vol. 196, pp. 107-116, 2017.

Kissa, "Fluorinated Surfactants: Synthesis, Properties, Applications", Marcel Dekker, Inc.: New York, pp. 344-345, 1994.

Makarevich et al., "Hydrophobic interactions during adsorption of fluorinated oligomeric ether surfactants at the liquid-gas interface," Russian Journal of Physical Chemistry, vol. 67, pp. 488-490, 1993. Translated from Zhurnal Fizicheskoi Khimii, vol. 67, pp. 542-544, 1993.

Ogino et al., "Synthesis of fluorinated surfactants containing hexafluoropropene oxide as a hydrophobic group and properties of the solutions," Yukagaku (Journal of Japan Oil Chemists' Society), vol. 32, pp. 96-101, 1983.

Ponomarenko et al., "Colloidal and chemical properties of aqueous solutions of sodium salts of perfluoro (alkoxyalkanecarboxylic)acids," Colloid Journal of the USSR, vol. 45, pp. 320-324, 1983. Translated from Kolloidnyi Zhurnal, vol. 45, pp. 359-363, 1983.

Prevedouros et al., "Source, Fate and Transport of Perfluorocarboxylates," Environ. Sci. Technol., vol. 40, pp. 32-44, 2006.

Shits et al., "Colloid-chemical properties of solutions of surface-active substances based on oligomers of perfluoropropylene oxide. 1. Surface activity of ammonium salts of perfluorooligoester monocarboxylic acids at an aqueous solution-air interface," Colloid Journal of the USSR, vol. 38, pp. 1110-1113, 1976. Translated from Kolloidnyi Zhurnal, vol. 38, pp. 1130-1134, 1976.

* cited by examiner

AQUEOUS POLYMERIZATION OF FLUORINATED MONOMER USING POLYMERIZATION AGENT COMPRISING FLUOROPOLYETHER ACID OR SALT AND SHORT CHAIN FLUOROSURFACTANT

FIELD OF THE INVENTION

This invention relates to a process for the dispersion polymerization of fluorinated monomer in an aqueous polymerization medium.

BACKGROUND OF THE INVENTION

A typical process for the aqueous dispersion polymerization of fluorinated monomer includes feeding fluorinated monomer to a heated reactor containing a fluorosurfactant and deionized water. Paraffin wax is employed in the reactor as a stabilizer for some polymerizations, e.g., polytetrafluoroethylene (PTFE) homopolymers. A free-radical initiator solution is employed and, as the polymerization proceeds, additional fluorinated monomer is added to maintain the pressure. A chain transfer agent is employed in the polymerization of some polymers, e.g., melt-processible TFE copolymers to control melt viscosity. After several hours, the feeds are stopped, the reactor is vented and purged with nitrogen, and the raw dispersion in the vessel is transferred to a cooling vessel.

For use in fluoropolymer coatings for metals, glass and fabric, polymer dispersion is typically transferred to a dispersion concentration operation which produces stabilized dispersions used as coatings. Certain grades of PTFE dispersion are made for the production of fine powder. For this use, the dispersion is coagulated, the aqueous medium is removed and the PTFE is dried to produce fine powder. Dispersions of melt-processible fluoropolymers for molding resin use are also coagulated and the coagulated polymer dried and then processed into a convenient form such as flake, chip or pellet for use in subsequent melt-processing operations.

As described in U.S. Pat. No. 3,391,099 to Punderson, dispersion polymerization involves two generally distinct phases. The initial period of the reaction is a nucleation phase in which a given number of polymerization sites or nuclei are established. Subsequently, there occurs a growth phase in which polymerization of fluorinated monomer on established particles occurs with little or no formation of new particles. Successful production of the high solids fluoropolymer dispersion generally requires the presence of the fluorosurfactant, especially in the later growth phase of polymerization in order to stabilize the dispersion preventing coagulation of the fluoropolymer particles.

Fluorosurfactants used in the polymerization are usually anionic, non-telogenic, soluble in water and stable to reaction conditions. The most widely used fluorosurfactants are perfluoroalkane carboxylic acids and salts as disclosed in U.S. Pat. No. 2,559,752 to Berry, specifically perfluorooctanoic acid and salts, often referred to as C8, and perfluorononanoic acid and salts, often referred to as C9. Because of recent environmental concerns with regard to perfluorooctanoic acid and salts, there is interest in reducing or eliminating perfluorooctanoic acid and its salts in fluoropolymer polymerization processes.

There has been a similar environmental concern with regard to perfluorooctane sulfonate (PFOS), an 8 carbon fluorosurfactant formerly sold by 3M as a stain repellent under the trademark Scotchguard®. For uses such as stain repellency, fluorosurfactants with short hydrophobic chain lengths, e.g., perfluorobutane sulfonate, have been used to replace perfluorooctane sulfonate. However, if attempts are made to employ short hydrophobic chain length fluorosurfactants in the commercial polymerization of fluoromonomers to achieve desirable solids concentrations, significant amounts of undispersed polymer (also referred to as coagulum) will form in the reactor. This coagulum typically must be discarded as waste. For example, the short chain fluoroether $CF_3CF_2CF_2OCF(CF_3)COOH$ is disclosed in Example XII of U.S. Pat. No. 3,271,341 to Garrison as a polymerization surfactant for polytetrafluoroethylene (PTFE). However, in this example which produces 1243 grams of PTFE dispersion, 500 grams of coagulum is produced, i.e., 29% of the total weight of PTFE produced is coagulum.

Rather than employ short chain fluorosurfactants, other known methods employ higher molecular weight materials such as fluoropolyethers in the polymerization of fluoropolymers. U.S. Pat. No. 4,864,006 to Gianetti et al. discloses the polymerization of fluorinated monomers in the presence of a perfluoropolyether having neutral end groups, perfluoropolyether oil, which is used in the form of an aqueous microemulsion. The perfluoropolyether oil has molecular weight of at least about 500 and the aqueous microemulsion of the oil is prepared using a suitable surfactant which can be selected from known perfluorinated carboxylic or sulfonic acids or from perfluoropolyethers having one or two acid end groups. U.S. Pat. No. 6,395,848 to Morgan et al. discloses an improved process for the aqueous dispersion polymerization of fluorinated monomers using a combination of fluorosurfactant, which can be a fluoroalkyl carboxylic or sulfonic acid or salt thereof or fluoroalkoxy aryl sulfonic acid or salt thereof, and perfluoropolyether carboxylic or sulfonic acid or salt thereof. The perfluoropolyether carboxylic or sulfonic acid or salt thereof employed in the examples of Morgan et al. have molecular weights ranging from 2000 to 7500. The fluoroalkyl carboxylic or sulfonic acid surfactants disclosed in Morgan et al. are those commonly used in dispersion polymerization such as perfluorooctanoic acid or salts and other fluorosurfactants with the same or longer chain length which can be used alone as polymerization surfactants.

SUMMARY OF THE INVENTION

The invention is based on the discovery that a fluoropolyether acid or salt having a number average molecular weight of at least about 800 g/mol in combination with a fluorosurfactant having a chain length of no greater than 6 provides an effective polymerization agent for use in the manufacture of fluoropolymers. The process of the invention comprises polymerizing at least one fluorinated monomer in an aqueous medium containing initiator and polymerization agent to form an aqueous dispersion of particles of fluoropolymer, the polymerization agent comprising:

fluoropolyether acid or salt thereof having a number average molecular weight of at least about 800 g/mol; and fluorosurfactant having the formula:

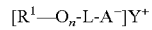

wherein:

$R^1$ is a linear or branched partially or fully fluorinated aliphatic group which may contain ether linkages;

n is 0 or 1;

L is a linear or branched alkylene group which may be nonfluorinated, partially fluorinated or fully fluorinated and which may contain ether linkages;

$A^-$ is an anionic group selected from the group consisting of carboxylate, sulfonate, sulfonamide anion, and phosphonate; and $Y^+$ is hydrogen, ammonium or alkali metal cation; with the proviso that the chain length of $R^1$—$O_n$-L- is not greater than 6 atoms.

DETAILED DESCRIPTION OF THE INVENTION

Fluoropolymer

Fluoropolymer dispersions formed by this invention are comprised of particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluorinated monomer used in the process of this invention is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2$=$CF$—$(O$—$CF_2CFR_f)_a$—$O$—$CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2$=$CF$—$O$—$CF_2CF(CF_3)$—$O$—$CF_2CF_2SO_2F$, perfluoro(3,6-dioxa-4-methyl-7-octenesulfonyl fluoride)), and in U.S. Pat. Nos. 4,358,545 and 4,940,525 ($CF_2$=$CF$—$O$—$CF_2CF_2SO_2F$). Another example is $CF_2$=$CF$—$O$—$CF_2$—$CF(CF_3)$—$O$—$CF_2CF_2CO_2CH_3$, methyl ester of perfluoro(4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful when producing dispersions of polytetrafluoroethylene (PTFE) including modified PTFE. PTFE and modified PTFE typically have a melt creep viscosity of at least about $1 \times 10^8$ Pa·s and, with such high melt viscosity, the polymer does not flow significantly in the molten state and therefore is not a melt-processible polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE contains a small amount of comonomer modifier which improves film forming capability during baking (fusing), such as perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule are also included.

The invention is especially useful when producing dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than 315° C.

A melt-processible TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene (E) or propylene (P) with TFE or CTFE, notably ETFE, ECTFE and PCTFE.

A preferred melt-processible copolymer for use in the practice of the present invention comprises at least about 40-98 mol % tetrafluoroethylene units and about 2-60 mol % of at least one other monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF2).

Further useful polymers are film forming polymers of polyvinylidene fluoride (PVDF) and copolymers of vinylidene fluoride as well as polyvinyl fluoride (PVF) and copolymers of vinyl fluoride.

The invention is also useful when producing dispersions of fluorocarbon elastomers. These elastomers typically have a glass transition temperature below 25° C. and exhibit little or no crystallinity at room temperature. Fluorocarbon elastomer copolymers made by the process of this invention typically contain 25 to 70 wt %, based on total weight of the fluorocarbon elastomer, of copolymerized units of a first fluorinated monomer which may be vinylidene fluoride (VF2) or tetrafluoroethylene (TFE). The remaining units in the fluorocarbon elastomers are comprised of one or more additional copolymerized monomers, different from said first monomer, selected from the group consisting of fluorinated monomers, hydrocarbon olefins and mixtures thereof. Fluorocarbon elastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluorocarbon elastomer copolymers include TFE/PMVE, TFE/PMVE/E, TFE/P and TFE/P/VF2. Preferred VF2 based fluorocarbon elastomer copolymers include VF2/HFP, VF2/HFP/TFE, and VF2/PMVE/TFE. Any of these elastomer copolymers may further comprise units of cure site monomer.

Fluorosurfactant

The fluorosurfactant employed in accordance with the invention is fluorosurfactant having the formula:

$$[R^1-O_n-L-A^-]Y^+ \quad (I)$$

wherein:
R$^1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;
A$^-$ is an anionic group selected from the group consisting of carboxylate, sulfonate, sulfonamide anion, and phosphonate; and
Y$^+$ is hydrogen, ammonium or alkali metal cation;
with the proviso that the chain length of R$^1$—O$_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of R$^1$—O$_n$-L- is 3 to 6 atoms. In accordance with one preferred form of the invention the chain length of R$^1$—O$_n$-L- is 4 to 6 atoms. In accordance with another preferred form of the invention the chain length of R$^1$—O$_n$-L- is 3 to 5 atoms. Most preferably, the chain length of R$^1$—O$_n$-L- is 4 to 5 atoms.

Typically, the surfactants employed in accordance with the invention have a surface tension values significantly higher than the surface tension values of perfluorooctanoic acid and salts under the same conditions. A polymerization agent comprising fluoropolyether acid or salt thereof having a number average molecular weight of at least about 800 g/mol in combination with the fluorosurfactant employed in accordance with the invention has a surface tension significantly lower that the surfactant used alone. This is illustrated in Table A of the Surface Tension Examples which follow. This effect is surprising based on the disclosure of U.S. Pat. No. 6,395,848 to Morgan et al. Morgan et al. discloses that the use of a perfluoropolyether having carboxylic acid ends has little if any effect on surface tension in combination with the surfactant 6,2-TBS, a surfactant with a chain length of 8 atoms.

In accordance with a preferred form of the invention, polymerization agent employed in the process comprising a fluorosurfactant to fluoropolyether weight ratio of 5:1 has a surface tension in water at a concentration of 6000 ppm at 23° C. of at least about 30% less than the surface tension of the fluorosurfactant alone in water at 23° C. at a concentration of 6000 ppm.

A preferred class of fluorosurfactants is fluoroether acids or salts, i.e., wherein n is 1 in Formula I above. Preferred fluoroether acids or salts in the accordance with the invention are fluorosurfactants according to Formula I wherein:

R$^1$ is a linear or branched partially or fully fluorinated alkyl group having 1 to 3 carbon atoms which may contain ether linkages; and L is an alkylene group selected from —CX(R$^2$)—, wherein R$^2$ is fluorine or perfluoromethyl and X is hydrogen or fluorine, and —CZ$^1$Z$^2$CZ$^3$Z$^4$—, wherein Z$^1$, Z$^2$, Z$^3$, and Z$^4$ are independently selected from hydrogen or fluorine.

Fluoroether acids and salts of this type are known. When L is an alkylene group selected from —CX(R$^2$)—, wherein R$^2$ is fluorine or perfluoromethyl and X is hydrogen or fluorine, the compound can be made, for example, by hydrolysis of perfluoro-2-alkoxypropionyl fluoride intermediates prepared by reacting alkanoic acid fluorides with hexafluoropropylene epoxide as disclosed in U.S. Pat. No. 3,291,843 to Fritz and Selman for use in perfluoro(alkyl vinyl ether) manufacture. When L is —CZ$_2$CZ$_2$—, wherein Z is independently selected from hydrogen or fluorine, routes to making such compounds are generally described In U.S. Pat. No. 2,713,593 (Brice et al.) where fluoro(alkoxypropionic) acids and derivatives are obtained in useful yields from corresponding hydrocarbon alkoxypropionic acids and derivatives by electrochemical fluorination. Fully fluorinated and partially fluorinated products can be separated for example by fractional distillation. Useful teachings for synthesis can also be found in EP 0 148 482 B1 (Ohsaka et al.) for partially fluorinated propoxy propionic acid fluoride which may be further fluorinated or perfluorinated by electrofluorinating the acid fluoride which is then easily converted to an acid or salt.

In accordance with another preferred form of the invention, L in Formula I is an alkylene group selected from —CF(CF$_3$)—, —CF$_2$—, —CF$_2$CF$_2$—, —CHFCF$_2$—, and —CF$_2$CHF—.

The fluorosurfactant used in accordance with the invention may be a diether if R1 or L contains an ether linkages. Such compounds are made, for example, by the teachings in WO 01/46116 A1 (Hintzer et al.) Preferred fluoroether acids or salts are fluoromonoethers where R$^1$ and L do not contain ether linkages.

In accordance with another preferred form of the invention, R$^1$ in Formula I is a linear partially or fully fluorinated alkyl group having 2 to 3 carbon atoms. Preferably, R$^1$ is fully fluorinated.

In accordance with another preferred form of the invention, the fluorosurfactant is highly fluorinated. "Highly fluorinated" means that at least about 50% of the total number of fluorine and hydrogen atoms in the fluorosurfactant are fluorine atoms. More preferably, at least about 75% of the total number of fluorine and hydrogen atoms in the fluorosurfactant are fluorine atoms, most preferably at least about 90%. Perfluorinated surfactants are also preferred for use in accordance with the invention.

In accordance with one preferred embodiment of the invention, the fluorosurfactant is a compound of the formula:

$$[CF_3CF_2CF_2OCF(CF_3)COO^-]Y^+ \quad (II)$$

wherein $Y^+$ is hydrogen, ammonium, or alkali metal cation. This is a compound is represented by Formula I wherein $R^1$ is $CF_3CF_2CF_2$—; L is —$CF(CF_3)$—; $A^-$ is carboxylate; and $Y^+$ is hydrogen, ammonium or alkali metal cation. Preferably, $Y^+$ is hydrogen or ammonium. A compound of this formula can be obtained from the perfluoro-2-propoxypropionyl fluoride intermediate prepared according U.S. Pat. No. 3,291,843 or dimerization of hexafluoropropylene epoxide and subsequent hydrolysis of the resulting acid fluoride to carboxylic acid in the case of the acid and, in the case of the salt, by simultaneous or subsequent reaction with the appropriate base to the produce the desired salt. A procedure for dimerization of hexafluoropropylene epoxide is disclosed in G.B. Patent 1 292 268.

In accordance with another preferred embodiment of the invention, the fluorosurfactant is a compound of the formula:

$$[CF_3CF_2OCF(CF_3)COO^-]Y^+ \quad (III)$$

wherein $Y^+$ is hydrogen, ammonium, or alkali metal cation. A compound of this formula can be obtained from the perfluoro-2-ethoxypropionyl fluoride intermediate prepared according U.S. Pat. No. 3,291,843 and subsequent hydrolysis of the resulting acid fluoride to carboxylic acid in the case of the acid and, in the case of the salt, by simultaneous or subsequent reaction with the appropriate base to the produce the desired salt.

In accordance with another preferred embodiment of the invention, the fluorosurfactant is a compound of the formula:

$$[CF_3CF_2CF_2OCF_2CF_2COO^-]Y^+ \quad (IV)$$

wherein $Y^+$ is hydrogen, ammonium, or alkali metal cation. A compound of this formula can be made, for example, by the teachings of U.S. Pat. No. 2,713,593 (Brice et al.).

In accordance with another preferred form of the invention, the fluorosurfactant is a compound of Formula I wherein n is 0 and $R^1$; L collectively comprises a perfluoroalkyl group having 4-6 carbons; and $A^-$ is sulfonate and sulfonamide anion. In a preferred embodiment of this form of the invention, $A^-$ is sulfonamide anion, the sulfonamide compound of Formula V below:

$$[C_4F_9SO_2N^-CH_2CH_2OH]Y^+ \quad (V)$$

wherein $Y^+$ is hydrogen, ammonium, or alkali metal cation. A surfactant of this formula as the ammonium salt is available commercially from 3M under the trademark NOVEC™ 4200.

In accordance with another preferred embodiment of the invention, the fluorosurfactant is a compound of the formula:

$$[CF_3CF_2CF_2CF_2CH_2CH_2SO_2^-]Y^+$$

wherein $Y^+$ is hydrogen, ammonium, or alkali metal cation.

Fluoropolyether Acid or Salt

The other component of the polymerization agent combination used in the practice of the present invention is a fluoropolyether acid or salt thereof. Preferably, the fluoropolyether is a perfluoropolyether acid or salt thereof. The acid groups of the fluoropolyether acid or salt thereof preferably are acid groups selected from carboxylic acid, sulfonic acid, sulfonamide, phosphonic acid. In preferred embodiments, the acid group of the fluoropolyether acid or salt is carboxylic acid. Preferably, the fluoropolyether acid is employed as a salt during polymerization, most preferably, an ammonium salt.

Preferred perfluoropolyether (PFPE) acids or salts thereof for use in accordance with the present invention can have any chain structure in which oxygen atoms in the backbone of the molecule are separated by saturated fluorocarbon groups having 1-3 carbon atoms. More than one type of fluorocarbon group may be present in the molecule. Representative structures have the repeat unit represented in the following formulas:

$$(-CFCF_3-CF_2-O-)_n \quad (VI)$$

$$(-CF_2-CF_2-CF_2-O-)_n \quad (VII)$$

$$(-CF_2-CF_2-O-)_n-(-CF_2-O-)_m \quad (VIII)$$

$$(-CF_2-CFCF_3-O-)_n-(-CF_2-O-)_m \quad (IX)$$

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, have 2 or 3 carbon atoms. Even more preferably, at least 50% of the fluorocarbon groups separating ether oxygens have 2 or 3 carbon atoms. Also, preferably, the PFPE has a total of at least 15 carbon atoms, e.g., the preferred minimum value of n or n+m in the above repeat unit structures is at least 5. More than one PFPE having an acid group at one or both ends can be used in a process in accordance with the invention. Typically, unless extraordinary care is employed to manufacture a single specific PFPE compound, the PFPE may contain multiple compounds in varying proportions within a molecular weight range about the average molecular weight.

The fluoropolyether acid or salt thereof has an average molecular weight which enables it to function in combination with fluoromonoether acid or salt as a polymerization agent in a process in accordance with the present invention. The number average molecular weight of the fluoropolyether acid or salt employed in accordance with the present invention is greater than about 800 g/mol. Fluoropolyether acids or salts with a number average molecular weight of greater than about 800 g/mol are defined in this patent application to be "polymeric fluoropolyethers". The number average molecular weight of the fluoropolyether acids or salts employed is usually less than about 6000 g/mol because fluoropolyether acids or salt with very high molecular weights generally are difficult to disperse in the aqueous polymerization medium. More preferably, the fluoropolyether acid or salt thereof employed in accordance with the invention has a number average molecular weight of about 800 to about 3500 g/mol, and most preferably 1000 to about 2500 g/mol.

Process

In the practice of a preferred embodiment of the invention, the process is carried out as a batch process in a pressured reactor. Suitable vertical or horizontal reactors for carrying out the process of the invention are equipped with stirrers for the aqueous medium to provide sufficient contact of gas phase monomers such as TFE for desirable reaction rates and uniform incorporation of comonomers if employed. The reactor preferably includes a cooling jacket surrounding the reactor so that the reaction temperature may be conveniently controlled by circulation of a controlled temperature heat exchange medium.

In a typical process, the reactor is first charged with deionized and deaerated water of the polymerization medium and fluoropolyether acid or salt and fluorosurfactant are dispersed in the medium. The dispersing of the fluoropolyether acid or salt and fluorosurfactant are discussed in more detail hereinafter. For PTFE homopolymer and modified PTFE, paraffin wax as stabilizer is often added. A suitable procedure for PTFE homopolymer and modified PTFE includes first pressurizing the reactor with TFE. If used, the comonomer such as HFP or perfluoro (alkyl vinyl ether) is then added. A free-radical initiator solution such as ammonium persulfate solution is then added. For PTFE homopolymer and modified PTFE, a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional TFE is added to maintain the pressure. The beginning of polymerization is referred to as kick-off and is defined as the point at which gaseous monomer feed pressure is observed to drop substantially, for example, about 10 psi (about 70 kPa). Comonomer and/or chain transfer agent can also be added as the polymerization proceeds. For some polymerizations, additional monomers, initiator and or polymerization agent may be added during the polymerization.

Batch dispersion polymerizations can be described as proceeding in two phases. The initial period of the reaction can be said to be a nucleation phase during which a given number particles are established. Subsequently, it can be said that a growth phase occurs in which the predominant action is polymerization of monomer on established particles with little or no formation of new particles. The transition from the nucleation to the growth phase of polymerization occurs smoothly, typically between about the 4 and about the 10 percent solids in for the polymerization of TFE.

After batch completion (typically several hours) when the desired amount of polymer or solids content has been achieved, the feeds are stopped, the reactor is vented and purged with nitrogen, and the raw dispersion in the vessel is transferred to a cooling vessel.

The solids content of the dispersion upon completion of polymerization can be varied depending upon the intended use for the dispersion. For example, the process of the invention can be employed to produce a "seed" dispersion with low solids content, e.g., less than 10%, which is employed as "seed" for a subsequent polymerization process to a higher solids level. In other processes, the solids content of fluoropolymer dispersion produced by the process of the invention is preferably at least about 10 wt %. More preferably, the fluoropolymer solids content is at least about 20 wt %. A preferred range for fluoropolymer solids content produced by the process is about 20 wt % to about 65 wt %, even more preferably about 20 wt % to about 55 wt %, most preferably, about 35 wt % to about 55 wt %.

In a preferred process of the invention, polymerizing produces less that about 10 wt %, more preferably less than 3 wt %, even more preferably less than 1 wt %, most preferably less that about 0.5 wt % undispersed fluoropolymer (coagulum) based on the total weight of fluoropolymer produced.

The as-polymerized dispersion can be stabilized with anionic, cationic, or nonionic surfactant for certain uses. Typically however, the as-polymerized dispersion is transferred to a dispersion concentration operation which produces concentrated dispersions stabilized typically with nonionic surfactants by known methods. Solids contents of concentrated dispersion is typically about 35 to about 70 wt %. Certain grades of PTFE dispersion are made for the production of fine powder. For this use, the dispersion is coagulated, the aqueous medium is removed and the PTFE is dried to produce fine powder.

The dispersion polymerization of melt-processible copolymers is similar except that comonomer in significant quantity is added to the batch initially and/or introduced during polymerization. Chain transfer agents are typically used in significant amounts to decrease molecular weight to increase melt flow rate. The same dispersion concentration operation can be used to produce stabilized concentrated dispersions. Alternatively, for melt-processible fluoropolymers uses as molding resin, the dispersion is coagulated and the aqueous medium is removed. The fluoropolymer is dried then processed into a convenient form such as flake, chip or pellet for use in subsequent melt-processing operations.

The process of the invention may also be carried out as a continuous process in a pressurized reactor. A continuous process is especially useful for the manufacture of fluorocarbon elastomers.

Initiators

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. For some fluoropolymers such as melt-processible TFE copolymers, water-soluble salts of inorganic peracids are employed which produce anionic end groups in the polymer. Preferred initiators of this type have a relatively long half-life, preferably persulfate salts, e.g., ammonium persulfate or potassium persulfate. To shorten the half-life of persulfate initiators, reducing agents such as ammonium bisulfite or sodium metabisulfite, with or without metal catalyst salts such as Fe, can be used. Preferred persulfate initiators are substantially free of metal ions and most preferably are ammonium salts.

For the production of PTFE or modified PTFE dispersions for dispersion end uses, small amounts of short chain dicarboxylic acids such as succinic acid or initiators that produce succinic acid such as disuccinic acid peroxide (DSP) are preferably also added in addition to the relatively long half-life initiators such as persulfate salts. Such short chain dicarboxylic acids are typically beneficial in reducing undispersed polymer (coagulum). For the production of PTFE dispersion for the manufacture of fine powder, a redox initiator system such as potassium permanganate/oxalic acid is often used.

The initiator is added to the aqueous polymerization medium in an amount sufficient to initiate and maintain the polymerization reaction at a desired reaction rate. At least a portion of the initiator is preferably added at the beginning of the polymerization. A variety of modes of addition may be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate and/or potassium persulfate employed during the course of polymerization are about 25 ppm to about 250 ppm based on the weight of the aqueous medium. Other types of initiators, for example, potassium permanganate/oxalic acid initiators, can be employed in amounts and in accordance with procedures as known in the art.

Chain Transfer Agents

Chain-transfer agents may be used in a process in accordance with the invention for the polymerization of some types of polymers, e.g., for melt-processible TFE copolymers, to decrease molecular weight for the purposes of controlling melt viscosity. Chain transfer agents useful for this purpose are well-known for use in the polymerization of fluorinated monomers. Preferred chain transfer agents include hydrogen, aliphatic hydrocarbons, halocarbons, hydrohalocarbons or alcohol having 1 to 20 carbon atoms, more preferably 1 to 8 carbon atoms. Representative examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is preferably about 0.005 to about 5 wt %, more preferably from about 0.01 to about 2 wt % based upon the weight of the resulting fluoropolymer.

Polymerization Agent

In accordance with the invention, the fluoropolyether acid or salt thereof and the fluorosurfactant is preferably dispersed adequately in aqueous medium to function effectively as a polymerization agent. "Dispersed" as used in this application refers to either dissolved in cases in which the fluoropolyether acid or salt and/or the fluorosurfactant are soluble in the aqueous or dispersing in cases in which the fluoropolyether acid or salt and/or the fluorosurfactant are not fully soluble and are present in very small particles, for example about 1 nm to about 1 µm, in the aqueous medium. Similarly, "dispersing" as used in this application refers to either dissolving or dispersing the fluoropolyether acid or salt and/or the fluorosurfactant so that they are dispersed as defined above. Preferably, the fluoropolyether acid or salt and fluorosurfactant are dispersed sufficiently so that the polymerization medium containing fluoropolyether acid or salt and fluorosurfactant appears water clear or nearly water clear. More preferably, an aqueous concentrate of the dispersed fluoropolyether acid salt and fluorosurfactant adjusted to contain 1500 ppm±100 ppm of the fluoropolyether acid or salt has a haze in the test method described hereinafter of less than about 10% and most preferably less than about 7%. A preferred range for the haze of the aqueous concentrate of the dispersed fluoropolyether acid or salt is from about 0 to about 10%.

Low haze values at 1500 ppm±100 ppm for the dispersed fluoropolyether acid or salt correlate with performance of the polymerization agent in the aqueous polymerization process, e.g., polymerizations employing lower haze concentrates produce less undispersed polymer (coagulum) than concentrates with higher haze values. Typically, the concentration of the fluorosurfactant in such concentrates does not affect the haze value as significantly as the fluoropolyether acid or salt, so concentrations for the dispersed fluoropolyether acid or salt of 1500 ppm±100 ppm are used for haze measurements rather than measuring haze at a selected concentration of the polymerization agent containing both fluoropolyether acid or salt thereof and the fluorosurfactant. Haze values of the aqueous polymerization medium itself containing the dispersed fluoropolyether salt are less sensitive to the contribution of haze by the fluoropolyether salt because of the low fluoropolyether salt content and may be affected by other components in the aqueous polymerization medium.

Dispersing of the fluoropolyether acid or salt thereof and the fluorosurfactant can be carried out in variety of methods. In one suitable procedure, the polymerization agent can be made directly in the aqueous polymerization medium. In this procedure, the fluoropolyether acid or salt is supplied in acid form and subsequently converted to salt form. This is accomplished by first adding ammonium hydroxide or alkali metal hydroxide, preferably ammonium hydroxide, to the aqueous polymerization medium in a quantity sufficient to substantially completely convert to salt form the subsequently added fluoropolyether acid. The fluoropolyether acid can then be added to the ammonium hydroxide or alkali metal hydroxide solution and, if desired, pH measurements can be made to determine if insufficient or excess base has been used. In addition, as known in the art, the amount of ammonium hydroxide or alkali metal hydroxide used, together with other materials added to the polymerization medium, should provide a pH in the aqueous polymerization medium which promotes the desired level of activity for the particular initiator system used and provides an operable pH range for the polymerization agent. The fluorosurfactant can be added to the aqueous polymerization medium prior to, simultaneously with or subsequently to the addition of the fluoropolyether acid.

In accordance with a preferred form of the process of the invention, the procedure for making the polymerization agent employs making an aqueous concentrate of the dispersed fluoropolyether acid or salt and fluorosurfactant which is subsequently added to a larger volume of aqueous polymerization medium. The concentrate can be made by reacting the fluoropolyether acid with a small volume of aqueous ammonium hydroxide or alkali metal hydroxide to produce the concentrate containing the salt form of the fluoropolyether acid. The surfactant is then added to the concentrate, preferably in the form of an ammonium or alkali metal salt. Alternatively, the reacting of the fluoropolyether acid with a small volume of aqueous ammonium hydroxide or alkali metal hydroxide to make the concentrate is done in the presence of the surfactant.

An appropriate quantity of the concentrate of the dispersed fluoropolyether acid or salt and fluorosurfactant is then mixed into the aqueous polymerization medium to supply the already dispersed fluoropolyether acid or salt and fluorosurfactant in the desired quantity. Preferably, the amount ammonium hydroxide or alkali metal hydroxide used to make the concentrate should provide a pH in the aqueous polymerization medium which promotes the desired level of activity for the particular initiator system used and provides an operable pH range for the polymerization agent.

In a preferred form of the invention, dispersing aids are used to assist with dispersing of the fluoropolyether acid or salt by contacting the acid or salt with the dispersing aid. A dispersing aid is especially useful for dispersing higher molecular weight fluoropolyether acid or salt thereof, e.g., above about 1200 g/mol. Dispersing aids are useful for either procedure discussed above for dispersing the fluoropolyether acid or salt, i.e., for dispersing into the polymerization medium or dispersing into the concentrate. Preferably, fluoropolyether acid or salt is contacted with the dispersing aid prior to dispersing the fluoropolyether acid or salt in the aqueous medium of the concentrate. Fluorosurfactant can be added after the fluoropolyether acid or salt is dispersed.

Any of a variety of dispersing aids may be used to aid in dispersing the fluoropolyether acid or salt for use in accordance with the present invention. A surfactant, preferably the fluorosurfactant to be used in polymerization, is useful to disperse fluoropolyether acid or salt. In general, and particularly when polymerizing a high molecular weight fluoropolymer, a low telogenic or non-telogenic dispersing aid is preferred. With some dispersing aids, it is desirable to mix the dispersing aid with fluoropolyether acid or salt prior to addition to the aqueous polymerization medium or to the aqueous medium that forms the concentrate.

One suitable class of dispersing aids includes C3 to C8 alcohols with a particularly suitable dispersing aid being t-butanol. When the fluoropolyether acid or salt is supplied in acid form and the ammonium salt is to be used in the polymerization agent, concentrates can be formed by simultaneously mixing fluoropolyether acid, t-butanol, and an aqueous ammonium hydroxide solution and stirring. Fluoromonoether acid or salt to form the effective polymerization agent combination can be added subsequently. Preferably, t-butanol is added in an amount of about 0.5× to about 3× the weight of the fluoropolyether acid although the lowest amount which is effective is preferably employed to decrease telogenic effects. C3 to C8 alcohols such as t-butanol would generally not be used for polymerization of PTFE or modified PTFE because their telogenic activity may interfere with achieving the high molecular weight usually desired. In some cases, it is desirable for water to be present with the C3 to C8 alcohol, i.e., an alcohol/water mixture is used, to effectively disperse the fluoropolyether acid or salt.

In accordance with another preferred form of the invention, the fluoropolyether acid or salt is supplied in acid form and also the surfactant to be used is also be supplied in acid form ($Y^+$ in Formula I is H). It has been discovered that the fluoropolyether acid and fluorosurfactant acid form will form a mixture which can readily be dispersed into an aqueous medium, i.e., the aqueous polymerization medium or aqueous solution to make the concentrate. In addition, the acid mixture is readily dispersed even when the fluoropolyether carboxylic acid has a high molecular weight and may otherwise require a dispersing aid. This preferred procedure is especially useful in the production of PTFE or modified PTFE where the telogenic effects of dispersing aids such as t-butanol may make it difficult to achieve a desired high molecular weight and would adversely affect the use of wax. In this preferred form of the invention, the fluoropolyether acid and fluorosurfactant in acid form are mixed together to form an acid mixture prior to addition to the aqueous polymerization medium or a concentrate. Preferably, the mixture of the fluoropolyether acid and fluorosurfactant comprises less than about 50 wt % water. In a preferred form of the invention which employs the polymerization agent in salt form, this acid mixture is contacted with ammonium hydroxide or alkali metal hydroxide. More preferably, this mixture is contacted with an aqueous ammonium hydroxide solution to form dispersed fluoropolyether salt and fluorosurfactant in ammonium salt form. In one preferred form of the invention, the contacting of the acid mixture with ammonium hydroxide or alkali metal hydroxide is performed by providing the ammonium hydroxide or alkali metal hydroxide in the polymerization medium and mixing the acid mixture into the polymerization medium to disperse the salts of the fluoropolyether acid and fluorosurfactant into the polymerization medium. In another preferred form of the process, the contacting of the acid mixture with ammonium hydroxide or alkali metal hydroxide is performed using aqueous ammonium hydroxide or aqueous alkali metal hydroxide to form an aqueous concentrate comprising dispersed salts of the fluoropolyether acid and fluorosurfactant. The aqueous concentrate is added to the aqueous polymerization medium to disperse the salts of the fluoropolyether acid and fluorosurfactant in the polymerization medium.

For the manufacture of concentrates containing dispersed fluoropolyether acid or salt and fluorosurfactant, aqueous ammonium hydroxide or aqueous alkali metal hydroxide solutions are preferably employed. Ammonium salts are preferred for the practice of this invention and thus aqueous ammonium hydroxide is preferably used. The aqueous ammonium hydroxide employed preferably has an ammonia content of about 15 to about 40 wt %.

To facilitate manufacture of the polymerization agent concentrates, is it sometimes desirable to first make a concentrate with a very high amount of the polymerization agent, e.g., 5000 to 500,000 ppm dispersed fluoropolyether acid or salt. Although this "superconcentrate" can be introduced directly into the polymerization medium, it is preferably diluted with a modest amount (10 to 100 volumes) of water first to make a concentrate which provides the dispersed polymerization agent to the aqueous polymerization medium. In adding the superconcentrate to the dilution water, it is preferred that the water be vigorously stirred and the concentrate be added slowly, dropwise or through a capillary or small diameter tube immersed in the stirred water at a point of high shear. If the superconcentrate is introduced into the polymerization vessel undiluted, the addition to water in the polymerization vessel preferably should similarly be done gradually with vigorous mixing. Vigorous mixing is generally desirable at all stages of manufacture of polymerization agent concentrates and introduction into the aqueous polymerization medium.

Preferred aqueous concentrates employed in accordance with the invention comprise about 1 to about 95 wt % water, most preferably about 50 to about 95 wt % water. Preferably, the aqueous concentrate comprises about 0.5 to about 50 wt % dispersed fluoropolyether acid or salt. Preferred concentrates are stable at room temperature, i.e., such concentrates can stand for at least one week at room temperature without any substantial quantity of the fluoropolyether acid or salt and fluorosurfactant separating from the concentrate.

In a preferred form of the invention, the polymerization agent employed in accordance with the present invention comprises a major amount by weight of fluorosurfactant and a minor amount by weight of fluoropolyether acid or salt thereof. More preferably, the fluorosurfactant comprises at least about 55 wt % of the polymerization agent, most preferably, at least about 65 wt % of the polymerization agent. This form of the invention can be used with various fluoropolymers but is particularly useful for the polymerization of PTFE or modified PTFE having a comonomer content of no greater than about 1 wt %. In another preferred form of the invention, the polymerization agent comprises a major amount of said fluoropolyether acid or salt thereof and a minor amount of fluorosurfactant. This form of the invention is useful for melt-processible copolymers such as copolymers comprising at least about 60-98 wt % tetrafluoroethylene units and about 2-40 wt % of at least one other monomer. It is generally desirable for the exact proportion of fluorosurfactant to the fluoropolyether acid or salt in the polymerization agent to be adjusted depending upon the fluorosurfactant used, the molecular weight of the fluoropolyether acid or salt used, the intended properties for the fluoropolymer dispersion, etc.

Preferably, the amount of fluoropolyether acid or salt used in the aqueous polymerization medium is about 5 to about 3,000 ppm based on the weight of water in the aqueous polymerization medium. More preferably, the amount of fluoropolyether acid or salt used in the aqueous polymerization medium is about 5 to about 2000 ppm based on the weight of water in the aqueous polymerization medium, even more preferably about 50 to about 1000 ppm, and most preferably about 100 to about 350 ppm. The total amount of polymerization agent combination used in a preferred process in accordance with the invention is about 5 to about 10,000 ppm based on the weight of water in the aqueous medium, more preferably about 5 to about 3000 ppm based on the weight of water in the aqueous medium. Even more preferably, the total amount of polymerization agent combination used is about 50 to about 3000 ppm based on the weight of water in the aqueous medium, still more preferably about 50 ppm to about 2000 ppm, most preferably, about 150 ppm to about 500 ppm.

At least a portion of the polymerization agent is preferably added to the polymerization prior to the beginning of the polymerization. If added subsequently, a variety of modes of addition for the polymerization agent may be used including continuously throughout the polymerization, or in doses or intervals at predetermined times during the polymerization. In accordance with one embodiment of the invention, substantially all of the polymerization agent is added to the aqueous medium prior to the start of polymerization, preferably prior to initiator addition.

In accordance with the invention, the aqueous medium comprises less than about 300 ppm of perfluoroalkane carboxylic acid or salt fluorosurfactants having 8 or more carbon atoms, based on the weight of water in the aqueous medium. Perfluoroalkane carboxylic acid or salt fluorosurfactants having 8 or more carbon atoms include such surfactants having for example 8-14 carbon atoms, e.g., perfluorooctanoic acid and salts and perfluorononanoic acid and salts. Preferably, the aqueous medium comprises less than about 100 ppm of perfluoroalkane carboxylic acid or salt fluorosurfactants having 8 or more carbon atoms, more preferably less than 50 ppm. In a preferred embodiment of the invention, the aqueous medium is substantially free of perfluoroalkane carboxylic acid or salt fluorosurfactants having 8 or more carbon atoms. Substantially free of perfluoroalkane carboxylic acid or salt fluorosurfactants having 8 or more carbon atoms means that aqueous medium contains no more than about 10 ppm of such fluorosurfactants.

In accordance with a preferred form of the invention the polymerization agent combination used in the practice of this invention is preferably substantially free of perfluoropolyether oil (i.e., perfluoropolyethers having neutral, non-ionic, preferably fluorine or hydrogen, end groups). Substantially free of perfluoropolyether oils means that aqueous polymerization medium contains no more than about 10 ppm of such oils based on water. This form of the invention is unlike the aqueous microemulsion system as disclosed in U.S. Pat. No. 4,864,006 to Gianetti et al. which employs such perfluoropolyether oils. Thus, the fluoropolymer dispersion preferably produced has high purity and contains low residual surfactant and preferably is substantially free of perfluoropolyether oils. Moreover, in a preferred process, the polymerization medium is substantially free of fluoropolymer seed at polymerization kick-off. In this preferred form of the invention, fluoropolymer seed, i.e., separately polymerized small fluoropolymer particles in dispersion form, is not added prior to the start of polymerization.

Unexpectedly, it has been found that a fluoropolyether acid or salt having a number average molecular weight of at least about 800 g/mol in combination with a fluorosurfactant having a chain length of no greater than 6 provides an effective polymerization agent for use in the manufacture of fluoropolymers; whereas, fluorosurfactants having a chain length of no greater than 6 when used alone do not produce the desired low coagulum levels at fluoropolymer solids concentrations for commercial fluoropolymer manufacture. The polymerization agent combination in accordance with the invention can produce fluoropolymers equivalent to those made using the typical perfluoroalkane carboxylic acid surfactants disclosed in U.S. Pat. No. 2,559,752 to Berry and at high dispersion solids concentrations.

Test Methods

The melting point (Tm) and glass transition temperature (Tq) of copolymers is measured by Differential Scanning calorimeter according to the procedure of ASTM D 4591. PTFE homopolymer melting point, the melting point the first time the polymer is heated, also referred to as the first heat, is determined by differential scanning calorimetry (DSC) by the method of ASTM D-4591-87. The melting temperature reported is the peak temperature of the endotherm on first melting.

Standard specific gravity (SSG) is measured by the method of ASTM D-4895.

Comonomer content (PPVE or HFP) is measured by FTIR according to the method disclosed in U.S. Pat. No. 4,743,658, col. 5, lines 9-23.

Comonomer content (PDD) is measured by IR by comparing the absorbance ratio at 2404 $cm^{-1}$ to 1550 $cm^{-1}$ to a calibration curve Melt flow rate (MFR) is measured according to ASTM D-1238 at the temperature which is standard for the specific copolymer.

Haze is measured on an aqueous concentrate of the dispersed fluoropolyether acid or salt and fluorosurfactant (and dispersing aid, if used) which is adjusted to contain 1500 ppm±100 ppm of the fluoropolyether acid or salt. The haze is measured in transmission mode on a Hunter® Color Quest XE spectrophotometer with sphere geometry using HunterLab Universal Software v 4.0. The sample cell is a 50 mm transmission cell. The transmission haze measurement is the ratio of diffused light to the total light transmitted by a specimen multiplied by 100 to express a percentage of transmission.

Surface Tension is determined using the Wilhelmy Plate Method on a Kruess Tensiometer, K11-MK2.

Surface Tension Examples

Surface tension of selected short chain and long chain surfactants are measured (1) as ammonium salts in water and (2) by combining the surfactants in water with a perfluoropolyether carboxylic acid having a number average molecular weight of about 2100 (n=about 12 in Formula VI). The perfluoropolyether carboxylic acid is available commercially available as Krytox® 157 FSL from DuPont. This perfluoropolyether carboxylic acid (referred to as PFPEA 2) is also employed in the Polymerization Examples illustrating polymerization in accordance with the invention.

In general the surfactant, if in acid form, is added to water with subsequent addition of aqueous ammonium hydroxide (30 wt % aqueous solution, wt % calculated as $NH_3$) and stirred either manually or with a magnetic stirrer. Additional water is added so that the surfactant concentration is 6000 ppm based on water with additional stirring as indicated. If the surfactant is in the form of an ammonium salt in water, the surfactant salt is diluted and stirred without adding more ammonium hydroxide. Sufficient water is added so that the surfactant concentration is 6000 ppm based on water.

Preparation of samples of the surfactant combined with perfluoropolyether carboxylic acid in a 5:1 weight ratio by the sequential addition of the PFPEA 2, water, aqueous ammonium hydroxide, surfactant, additional water as needed and stirred either manually or with a magnetic stirrer. The visual appearance of the samples is generally clear with haze less than 5%. Sufficient water is added so that the surfactant concentration is 6000 ppm based on water.

Surface Tension measurements are made using the Kruess Tensiometer, K11-MK2. Surface tension data is the average of 10 data points taken by the instrument. Measurements are done at ambient temperature (23° C.). Surface tensions of the surfactant alone and of the surfactant combined with PFPEA 2 are reported in Tables A and B. The surfactants with short chain lengths have surface tension values significantly higher than the surface tension values of perfluorooctanoic acid and salts and many of the other long chain length surfactants under the same conditions. A short chain surfactant in combination with the PFPEA 2 has a surface tension significantly lower than the surfactant used alone, i.e., a surface tension in water at a concentration of 6000 ppm at 23° C. of at least about 30% less than the surface tension of the fluorosurfactant alone in water at 23° C. at a concentration of 6000 ppm.

TABLE A

Short Chain Polymerization Surfactants

| Example # | STRUCTURE | CHAIN LENGTH | Surf | Surf/FSL 5:1 |
|---|---|---|---|---|
| Example I | $C_2F_5-O-CF(CF_3)-C(=O)-ONH_4$ | 4 | 53.8 | 26.3 |
| Example II | $[C_4F_9-SO_2-N^-CH_2CH_2OH]NH_4^+$ | 4 | 43.7 | 19.0 |
| Example III | $C_3F_7-O-CF(CF_3)-C(=O)-ONH_4$ | 5 | 44.5 | 24.5 |
| Example IV | $C_3F_7-O-(CF_2)_2-C(=O)-ONH_4$ | 6 | 45.3 | 22.6 |
| Example V | $C_4F_9CH_2CH_2SO_3Na$ | 6 | 42.5 | 26.9 |

Surface tension column header: SURFACE TENSION @ 6000 ppm dynes/cm

The surface tension of deionized water is recorded as 67.9 dynes/cm when surface tension measurements of Examples I-IV are made.

TABLE B

Long Chain Polymerization Surfactants

| Example # | STRUCTURE | CHAIN LENGTH | Surf | Surf/FSL 5:1 |
|---|---|---|---|---|
| Example VI (Comp.) | $C_7F_{15}-C(=O)-ONH_4$ | 7 | 26.8 | 33.0 |
| Example VII (Comp.) | $C_2F_5-O-(CF_2)_2-O-CF_2-C(=O)-ONH_4$ | 7 | 42.4 | 43.5 |

Surface tension column header: SURFACE TENSION @ 6000 ppm Dynes/cm

TABLE B-continued

Long Chain Polymerization Surfactants

| Example # | STRUCTURE | CHAIN LENGTH | Surface Tension @ 6000 ppm Dynes/cm Surf | Surf/FSL 5:1 |
|---|---|---|---|---|
| Example VIII (Comp.) | $C_3F_7\text{—}O\text{—}(CF_2)_3\text{—}\overset{\overset{O}{\|}}{C}\text{—}ONH_4$ | 7 | 22.6 | 36.2 |
| Sample IX (Comp.) | $C_6F_{13}\text{—}CH_2CH_2\text{—}SO_3\,NH_4$ | 8 | 21.2 | 29.2 |
| Sample X (Comp.) | $C_8F_{17}\text{—}\overset{\overset{O}{\|}}{C}\text{—}ONH_4$ | 8 | 15.4 | 16.7 |

The surface tension of deionized water is recorded as 67.9 dynes/cm when surface tension measurements of Comp. Examples VI and VII are made.
The surface tension of deionized water is recorded as 62.5 dynes/cm when surface tension measurements of Example VII, IX and X are made.

POLYMERIZATION EXAMPLES

Polymerization Agent Components

In Examples 1-9 and Comparative Examples 5-7, fluoromonoether acid is employed having the formula $CF_3CF_2CF_2OCF(CF3)COOH$ (referred to as dimer acid or DA) which is converted to the ammonium salt in the examples which follow (referred to as dimer acid salt or DAS).

In Examples 10-14 and Comparative Examples 8-10, a fluoroalkylsulfonamide fluorosurfactant is employed having a formula $C_4F_9SO_2NHCH_2CH_2OH$. The surfactant is available from 3M Specialty Materials, St Paul, Minn., under the trademark NOVEC™ 4200 in the form of an aqueous ammonium salt, 25 wt %.

Two fluoropolyether acids are employed which are perfluoropolyether acids having carboxylic acid group (PFPEA) each having the repeat unit of Formula VI above and are converted to ammonium salts in the examples which follow. PFPEA 1 has a number average molecular weight of about 1165 (n=about 6 in Formula VI). PFPEA 2 has a number average molecular weight of about 2100 (n=about 12 in Formula VI). PFPEA 2 is available commercially available as Krytox® 157 FSL from DuPont.

The ammonium hydroxide in Examples 1-9 and Comparative Examples 5-7 is a 30 wt % aqueous solution (wt % calculated as $NH_3$).

For the Examples 1, 2 and 4 containing PFPEA 1, polymerization agent concentrates containing PFPEA 1 are made by first adding 510 g of deionized water to a 1 liter glass container. The amount of 30 wt % ammonium hydroxide indicated in Table 1 is added to the 510 g of deionized water. Then, the amount of PFPEA 1 indicated in Table 1 is added. The contents of the container are mixed either mechanically or with ultrasound to produce a slightly cloudy mixture (haze less than about 7%). The amount of dimer acid salt (DAS) as indicated in the Table 1 below is added. Upon additional mixing, the mixture becomes water clear.

TABLE 1

| Example | PFPEA1 (g) | DAS (g) | $NH_4OH$ (g) |
|---|---|---|---|
| Ex 1 | 1.06 | 18.9 | 0.9 |
| Ex 2 | 1.3 | 0.317 | 1.11 |
| Ex 4 | 1.3 | 0.317 | 1.11 |

For Example 3, a polymerization agent concentrate containing PFPEA 2 is made by adding 4.27 g PFPEA 2, 8.54 g t-butanol (dispersing aid), 14.7 g deionized water, and 0.96 g 30 wt % ammonium hydroxide to a vial which is sealed and shaken under cold running water to remove the heat of reaction. A colorless, single phase liquid results. This liquid is added dropwise with agitation to 878.7 g of deionized water and a clear mixture results (Haze less than about 3%). 0.56 g dimer acid salt (DAS) is added with stirring. The final mixture is water clear (haze less than about 3%).

For Examples 5-8, polymerization agent concentrates are prepared by mixing 5 g dimer acid (DA) and 1.3 g PFPEA 2 in a vial. To this mixture is added dropwise with mild agitation, 1.86 g of aqueous ammonium hydroxide (30 wt %). This mixture is added dropwise to 900 g deionized water with vigorous stirring. The final mixture is water-clear (haze less than about 3%) and has a pH of 8.5. The dimer acid in these examples is functioning as dispersing aid for the PFPEA 2 as well as a component of the polymerization agent.

For Example 9, a polymerization agent concentrate is made by mixing 14.25 g of dimer acid and 3.71 g of PFPEA 2 in a vial. While cooling the vial in ice, 5.3 g of aqueous ammonium hydroxide (30 wt %) is added dropwise with mixing. The resulting mixture is water clear, and is added dropwise to 900 g of deaerated water with stirring to produce a water-clear (haze less than about 3%) solution of pH 9. A second portion of surfactant solution is made the same way. The dimer acid in this example is functioning as dispersing aid for the PFPEA 2 as well as a component of the polymerization agent.

Examples 1-3

The process of the invention is illustrated in the polymerization of melt-processible copolymers of tetrafluoroethylene (TFE) with perfluoro(alkyl vinyl ether), i.e., perfluoro(propyl vinyl ether) (PPVE).

Deaerated water is used in the polymerizations. It is prepared by pumping deionized water into a large stainless steel vessel and vigorously bubbling nitrogen gas for approximately 30 minutes through the water to remove all oxygen.

In a 12 liter, horizontal autoclave, equipped with a paddle agitator, 7.57 kg of deaerated water is added. 510 ml of the PFPEA 1 or PFPEA 2 concentrates described above are charged to the autoclave to provide the polymerization medium for the Examples. Based on the amounts employed to make the concentrates, Table 2A shows the amounts of polymerization agent components in the polymerization medium (ppm based on weight of water in the aqueous medium) with initiator, chain transfer agent, and monomers.

A vacuum of approximately 28 inches of water column (7 kPa) is applied to the reactor. The reactor is then raised to 30 psig (310 kPa) with gaseous tetrafluoroethylene (TFE) while agitating at 70 rpm. The agitator is stopped and the TFE pressure reduced to approximately 10 psig (100 kPa) by venting. This pressure/vent cycle is conducted two more times, further insuring that the contents of the autoclave are free of oxygen. Ethane (0.3-0.5 g) and perlluoro(propyl vinyl ether) (PPVE) (100 g) is then added to the reactor.

The reactor is then heated to 75° C. with agitation at 100 rpm. When at temperature, the reactor pressure is raised to a nominal 300 psig (2.17 MPa) by adding TFE (270-330 g). Initiator solution, containing 6.2 grams of ammonium persulfate in 1 liter of deionized water, is charged to the autoclave at a rate of 100 ml/min to provide a precharge of 0.45-0.74 g ammonium persulfate as indicated in Table 2A.

The same initiator solution is pumped continuously to the autoclave during polymerization at a rate of 0.54 ml/min. At kickoff (defined as the point at which a 10 psig (70 kPa) pressure drop is observed) the polymerization is deemed to have been started. Reactor pressure is allowed to cycle between 285 psig (2.1 MPa) and 315 psig (2.28 MPa) by intermittently making up monomers composed of 96 wt % TFE and 4 wt % PPVE. After the total monomers (including precharged PPVE and TFE) stated in Table 2A is reached, the agitator is stopped and the reactor vented to atmospheric pressure. The fluoropolymer dispersion thus produced has a solids content of greater than 10%. Polymer is isolated from the dispersion by freezing, thawing and filtration. Using a high speed agitator, the polymer is washed in demineralized water and filtered several times before being dried overnight in a vacuum oven at 100 to 110° C. and a vacuum of 6 to 10 mm Hg (0.8-1.3 kPa). Results are reported in Table 2B.

Comparative Examples 1-7

Following the general procedure of Examples 1-3, Comparative Examples are made in which one or the other of PFPEA and DAS is used, but not both. In Comparative Examples 1-4, only PFPEA is used (PFPEA2). In Comparative Examples 5-7, only DAS is used. Table 2A shows the amounts of polymerization agent components in the polymerization medium (ppm based on weight of water in the aqueous medium) with initiator, chain transfer agent, and monomers. Polymerization results are summarized in Table 2B. In contrast to Examples 1-3, the Comparative Examples give product that is gelled, or settled, both conditions indicative of unstable dispersions, or with much undispersed polymer in addition to dispersion, also an indication of insufficiently stabilized dispersion. Neither PFPEA nor DAS alone are sufficient to permit aqueous dispersion polymerization making polymer dispersion to solids greater than about 10 wt %.

TABLE 2A

TFE/PPVE Polymerization

| Example | PFPEA^ (g) | PFPEA^ (ppm) | DAS (g) | DAS (ppm) | APS (g) | Ethane (g) | Total Monomers (g) |
|---|---|---|---|---|---|---|---|
| Ex 1 | 1.06 | 130 | 18.9 | 2310 | 0.764 | 0.5 | 3096 |
| Ex 2 | 1.3 | 159 | 0.317 | 39 | 0.618 | 0.5 | 2024 |
| Ex 3 | 1.3 | 159 | 0.317 | 39 | 0.747 | 0.5 | 2036 |
| Comp. Ex. 1* | 1.3 | 159 | 0 | — | 0.609 | 0 | 2085 |
| Comp. Ex. 2* | 1.3 | 159 | 0 | — | 0.609 | 0 | 2060 |
| Comp. Ex. 3* | 6.3 | 768 | 0 | — | 0.620 | 0 | 2070 |
| Comp. Ex. 4* | 1.615 | 197 | 0 | — | 0.499 | 0.5 | 1968 |
| Comp. Ex. 5 | 0 | — | 1.62 | 198 | 0.643 | 0.5 | 2065 |
| Comp. Ex. 6 | 0 | — | 1.617 | 197 | 0.499 | 0.5 | 1995 |
| Comp. Ex. 7 | 0 | — | 1.617 | 197 | 0.499 | 0.5 | 2031 |

^Examples 1-2 use PFPEA 1. Example 3 and Comparative Examples 1-4 use PFPEA 2.
*t-butanol used as dispersing aid in preparing surfactant mixture.

TABLE 2B

TFE/PPVE Polymerization

| Example | Kick-off (min) | Completion Time (min) | Solids wt % | M. Pt. (° C.) | PPVE wt % | MFR | Undispersed Polymer (g) | wt %** |
|---|---|---|---|---|---|---|---|---|
| Ex 1 | 4 | 125 | 23.7 | 311 | 3.88 | 1.3 | 11.9 | 0.5% |
| Ex 2 | 3 | 92 | 15.9 | 309 | 4.69 | 21 | 0.58 | 0.0% |
| Ex 3 | 1 | 133 | 17.0 | 311 | 4.46 | >50* | 7.47 | 0.4% |

TABLE 2B-continued

TFE/PPVE Polymerization

| Example | Kick-off (min) | Completion Time (min) | Solids wt % | M. Pt. (° C.) | PPVE wt % | MFR | Undispersed Polymer (g) | wt %** |
|---|---|---|---|---|---|---|---|---|
| Comp. Ex 1* | 3 | 98 | Gel | 295, 322 | 4.10 | No flow | — | — |
| Comp. Ex 2* | 2 | 102 | Gel | 296, 321 | 4.76 | No flow | — | — |
| Comp. Ex 3* | 2 | 125 | Gel | 296, 319 | 5.59 | No flow | — | — |
| Comp. Ex 4* | 1 | 144 | Gel | 311 | 4.45 | >50 | — | — |
| Comp. Ex 5 | 15 | 88 | 16.9 | 310 | 3.87 | 9.5 | 230 | 12 |
| Comp. Ex 6 | 1 | 120 | Settled | 314 | 3.34 | 25 | 1425 g | >75 |
| Comp. Ex 7 | 1 | 101 | settled | 313 | 3.95 | 14 | — | — |

*t-butanol used as dispersing aid in preparing surfactant mixture. Chain transfer activity appears to have affected melt flow rate.
**Based on polymer.

Example 4

The process of the invention is illustrated in the polymerization of a melt-processible copolymer of tetrafluoroethylene (TFE) with hexafluoropropylene (HFP).

Tetrafluoroethylene-hexafluoropropylene copolymerization is run like that of tetrafluoroethylene-perfluoro(propyl vinyl ether) Examples 1-2 (PFPEA1) with these differences:

Total water (initial charge plus water added with initiator and polymerization agent) 6540 g. Initiator precharge is 0.66 g of 6.2 g/liter water solution. Initial HFP charge is 568 g. Initial TFE charge is 379 g, as a 60:40 blend of the gases. HFP:TFE feed during polymerization is 1200 g/hr of a 12:88 mixture.

Table 3A shows the amounts of polymerization agent components in the polymerization medium (ppm based on weight of water in the aqueous medium) with initiator, chain transfer agent, and monomers. Polymerization results are summarized in Table 3B.

TABLE 3A

TFE/HFP Polymerization

| Example | PFPEA 1 (g) | PFPEA 1 (ppm) | DAS (g) | DAS (ppm) | APS (g) | Ethane (g) | Total Monomers (g) |
|---|---|---|---|---|---|---|---|
| Ex 4 | 1.3 | 199 | 0.317 | 48 | 3.630 | 0 | 2884 |

TABLE 3B

TFE/HFP Polymerization

| Example | Kick-off (min) | Completion Time (min) | Solids wt % | MPt. (° C.) | HFP wt % | MFR | Undispersed Polymer (g) | wt % |
|---|---|---|---|---|---|---|---|---|
| Ex 4 | 6 | 89 | 15.2 | 264 | 10.3 | 55 | 11.6 | 0.9% |

Examples 5-7

The process of the invention is illustrated in the polymerization of polytetrafluoroethylene (PTFE) homopolymer.

A 12 liter, horizontal autoclave, equipped with a paddle agitator, is purged with nitrogen, and then a vacuum of about 20 inches Hg (67 kPa) is applied to facilitate the addition of ingredients. After addition of ingredients, the vacuum is applied again. The ingredients are as follows in the order of addition:

1. Wax (260 g) is melted under nitrogen and is added to the reactor through a heated addition funnel.
2. Deaerated Water, 4375 g.
3. Polymerization Agent Concentrate (PFPEA 2/DAS mixture described above), 900 ml
4. Succinic acid, 3 g in 500 ml solution.
5. Oxalic acid 15 ml of a 100 ml aqueous solution containing 2 g oxalic acid.

The concentration of PFPEA 2 is 224 ppm, and that of DAS is 863 ppm, based on the polymerization medium (water) before initiation.

Tetrafluoroethylene (TFE) is added to bring the reactor pressure to about 30 psig (310 kPa). The reactor is then vented to just above atmospheric pressure. This pressure/vent cycle is repeated twice.

The reactor is heated to 80° C., the agitator being started at 65 rpm when the temperature reaches 60° C. TFE is added to bring the reactor pressure to about 400 psig (2.9 MPa). This is about 685 g of TFE.

Initiator solution (the "precharge") is added, 50-80 ml at 100 ml/min, followed by a continuous addition at 1.5 ml/min. The initiator solution is 0.15 g potassium permanganate ($KMnO_4$) in 1000 g deaerated water containing 5 ml of diammonium phosphate $(NH_4)_2HPO_4$ solution, which is 2.8 g $(NH_4)_2HPO_4$ in 200 ml water.

About 1 minute after initiator is added, kickoff occurs (defined as the point at which a 10 psig (70 kPa) pressure drop is observed) and polymerization begins. During polymerization TFE is added periodically to maintain reactor pressure between 395 and 405 psig (2.7 and 2.8 MPa). After 1100 g of TFE have been consumed, initiator feed is stopped. After 2500 g of TFE have been consumed, the agitator is stopped and the reactor is vented. The polymer dispersion is drained from the reactor while still hot, and allowed to cool. After cooling the solidified wax is separated and weighed. The reactor is opened and cleaned, the material recovered on cleaning being designated undispersed polymer, which is weighed.

The dispersion is weighed and the percent solids is determined. Polymer is recovered by freezing and thawing a portion of the dispersion to coagulate polymer, and washing and drying the coagulate.

The results are summarized in Table 4. All show polymer at about 30 wt % solids, with melting points characteristic of polytetrafluoroethylene.

TABLE 4

TFE Homopolymerization

| Ex. | Total TFE (g) | Run-time (min) | Dispersion wt. (g) | Solids (wt %) | Wax Recovered (g) | Undispersed Polymer (g) | Undispersed Polymer % | Dispersion pH | SSG | Melting Point (° C.) |
|---|---|---|---|---|---|---|---|---|---|---|
| 5 | 2500 | 215 | 8202 | 29.9 | 119 | 254 | 9.4 | 4 |  | 345.6 |
| 6 | 2500 | 286 | 8248 | 29.3 | 153 | 182 | 7.0 | 4 | 2.177 | 345.8 |
| 7 | 2500 | 159 | 8170 | 28.0 | 162 | 148 | 6.1 | 4 |  | 345.4 |

Example 8

Polymerization conditions are similar to those of Examples 5-7, except that the initiator is changed to disuccinic acid peroxide (DSP) with a small amount of ammonium persulfate (APS). DSP, 1.5 g, is added in 100 ml aqueous solution and 1 ml of a 1 wt % aqueous solution of APS. TFE consumption is 2000 g. Total run time is 227 min. The polymer dispersion weighs 7906 g and is 26.7% solids. Polymer melting point is 344.7° C. 370 g of wax is recovered (this exceeds the wax charged, indicating that some coagulum is mixed with the recovered wax). The reactor is not opened so coagulum is not determined.

Example 9

DSP with APS initiator is used as in Example 8, but the horizontal autoclave equipped with a paddle agitator has a capacity of 34.4 liter (approximately 9 gallon). The water charged is 14,700 g, and wax 850 g. 1800 ml of the PFPEA 2/DAS polymerization agent concentrate made as described above then charged to the autoclave. The reactor is charged with 1716 g of TFE to 375 psig (2.7 MPa). The initiator charge is 340 g of an aqueous solution containing 11.9 g of disuccinic acid peroxide and 3.4 ml of a 1 wt % aqueous ammonium persulfate solution. TFE consumption is 9000 g. Total run time is 223 min. 25,637 g of dispersion is recovered. Solids is 35.1%. SSG is 2.203. Recovered wax is 578 g. Coagulum is 622 g, 6.5 wt %.

Examples 10-14, Comparative Examples 8-10

The process of the invention is illustrated in the polymerization of tetrafluoroethylene (TFE) and perfluoro(2,2-dimethyl-1,3-dioxole) (PDD) copolymers.

TFE and perfluoro(2,2-dimethyl-1,3-dioxole) (PDD) copolymers are prepared in a 1 L vertical stainless steel jacketed autoclave equipped with a ribbon agitator with 3 blades about 0.61 cm (¼") wide and 12.7 cm (5") long, and 2 vertical baffles 0.61 (¼") wide that spanned the height of the reactor. The reactor is conditioned by charging 600 mL deionized (DI) water containing 2.5 g ammonium persulfate (APS) and heating this mixture with vigorous agitation to 90° C. for 3 hrs. The reactor is drained, flushed with DI water and refilled with 600 mL of fresh DI water. The reactor and its contents are purged and evacuated with nitrogen three times and 25 mL of polymerization agent, as noted in the Table 5A below, is added. The reactor contents are then warmed to 60° C. and the nitrogen atmosphere in the reactor is evacuated and replaced with TFE. When thermal equilibrium is established, TFE and PDD flows are fed to the reactor at the precharge ratio specified in the tables. Gaseous TFE feed is monitored and controlled by a mass flow meter and liquid PDD flows are controlled by a Gilson metering pump. Monomer feeds are continued until the desired reactor pressure is attained. Flows are stopped and this completes the monomer precharge. Polymerization is initiated by injecting 10 mL of DI water containing 1.0 g APS and observed by a decrease in reactor pressure. At that time monomer flows at the specified ratio are restarted and at a rate sufficient to maintain reactor pressure. In examples 12-15 and 17, the reactor pressure is 48 psig. In example 16, the reactor pressure is 30. Flows are continued until predetermined amounts of monomers are fed to the reactor. At that point flows are stopped and after a brief holding period the reactor is cooled, vented to atmospheric pressure and the polymer dispersion is discharged. The collected dispersion is weighed and compared to the total weight of all materials charged to the reactor. This mass balance check is useful to determine if coagulation of the polymer has occurred in the reactor. Mass balances less than 90% indicate significant coagulation has occurred.

The above procedure is used to evaluate the polymerization agent comprising sulfonamide Novec™ 4200 surfactant and the sulfonamide in combination with PFPEA 2 in the emulsion polymerization of TFE and PDD.

Novec™ 4200 surfactant as supplied (25 wt % aqueous solution of the ammonium salt) is combined with PFPEA 2. No additional ammonium hydroxide is added. This mixture is shaken and rolled for several hours to make a concentrate.

The results are summarized in Tables 5 A and 5B below. The Comparative Examples are characterized by low solids in the product dispersion, low polymer yields and early termination of polymerization reflected by the short feed times for monomer. The glass transition temperature (Tg) and PDD content of the polymer made in the Comparative Examples are lower than runs made under similar conditions in the Examples. The MFR for polymer made in the Comparative Examples also tends to be so high that the polymer runs rapidly out of the melt indexer and precludes measurement. These results all indicate that Novec™ 4200 by itself or with a minimum amount of PFPEA 2 (as shown in Comparative Example 9) is ineffective as a polymerization surfactant. Results for runs employing Novec™ 4200 and at least 200 mg PFPEA 2 reliably yield consistent polymerization results indicating that under these conditions these mixtures are suitable surfactants for polymerization.

TABLE 5A

TFE/PDD Polymerization

| Ex. | PFPEA2 (g) | PFPEA2 (ppm) | Novec™ 4200 (g) | Novec™ 4200 (ppm) | Precharge PDDG | Precharge TFEG | Precharge Ratio | Make-up PDDg | Make-up TFEG | Make-up Ratio |
|---|---|---|---|---|---|---|---|---|---|---|
| 10 | 300 mg | 480 ppm | 3.75 g | 6000 | 23.65 | 4.01 | 5.90 | 132.3 | 22.43 | 5.90 |
| 11 | 300 mg | 485 ppm | 2.00 g | 3200 | 27.01 | 4.58 | 5.90 | 131.4 | 22.28 | 5.90 |
| 12 | 200 mg | 322 ppm | 3.00 g | 4800 | 29.22 | 4.95 | 5.90 | 132.6 | 22.48 | 5.90 |
| 13 | 200 mg | 316 ppm | 5.75 g | 9100 | 28.48 | 4.88 | 5.84 | 135.0 | 23.18 | 5.82 |
| 14 | 200 mg | 316 ppm | 5.75 g | 9100 | 25.53 | 4.42 | 5.78 | 133.2 | 23.07 | 5.77 |
| C-8 | 0 | 0 ppm | 4.0 g | 6400 | 26.15 | 4.49 | 5.82 | 133.2 | 22.88 | 5.82 |
| C-9 | 100 mg | 160 ppm | 3.75 g | 6000 | 26.89 | 4.60 | 5.85 | 132.9 | 22.54 | 5.90 |
| C-10 | 0 | 0 ppm | 6.00 g | 9500 | 24.65 | 4.25 | 5.80 | 61.08 | 10.55 | 5.79 |

TABLE 5B

TFE/PDD Polymerization

| Example | Feed Time (hr:min) | Tg (° C.) | PDD wt % | MFR (g/10 min) | Polymer Solids % | Polymer (g) | Mass Balance % | Undispersed** Polymer (g) | Undispersed** Polymer wt % |
|---|---|---|---|---|---|---|---|---|---|
| 10 | 4:22 | 154 | 65.6 | 0.26 | 18.1 | 142.0 | 96.5 | 3.1 | 2.1 |
| 11 | 4:49 | 160 | 60.5 | 0.52 | 18.6 | 141.2 | 94.6 | 6.2 | 4.2 |
| 12 | 5:10 | 162 | 66.9 | 0.88 | 18.8 | 145.3 | 95.1 | 5.3 | 3.5 |
| 13 | 3:55 | 153 | 63.0 | 0.47 | 18.7 | 146.8 | 94.9 | 5.6 | 3.6 |
| 14 | 3:55 | 158 | 64.3 | | 18.4 | 145.4 | 96.2 | 2.8 | 1.8 |
| C-8 | 3:51 | 124 | 54.8 | 0.50 | 11.8 | 82.9 | 86.1 | 65.8 | 44.3 |
| C-9 | 3:57 | 139 | 54.5 | v high | 8.3 | 67.2 | 76.1 | 81.5 | 54.8 |
| C-10 | 2:11 | 114 | 50.0 | v high | 6.0 | 41.0 | 93.5 | 39.0 | 48.8 |

**Based on polymer and on expected amount of polymer produced from 80% monomer conversion.

Example 15

The process of the invention is illustrated in the polymerization of a fluorocarbon elastomer copolymer of tetrafluoroethylene (TFE), perfluoro(methyl vinyl)ether (PMVE), and perfluoro-8(cyano-5-methyl-3,6-dioxa-1-octene) (8CNVE).

Three aqueous streams are each fed continuously to a 1 liter mechanically stirred, water jacketed, stainless steel autoclave at a rate of 81 cubic centimeters/hour. The first stream consists of 3.4 g ammonium persulfate and 89.7 g of disodium hydrogen phosphate in 3 liters of deionized water. The second consists of a polymerization concentrate of 180 g of DA, 36 g of PFPEA 2, and 35 g 30 wt % ammonium hydroxide in 4 liter of deionized water. The third stream consists of 3.4 g ammonium persulfate in 3 liters of deionized water. Using a diaphragm compressor, a mixture of TFE (56.3 g/hour) and PMVE (68.6 g/hour) is fed at constant rate. The liquid monomer, 8CNVE, is fed separately at a rate of 3.4 g/hour. The temperature is maintained at 85° C., the pressure at 4.1 MPa (600 psi), and the pH at 6.3 throughout the reaction. Emulsion copolymer solids ultimately reach 26 wt %. Polymer emulsion is removed continuously by means of a letdown valve and the unreacted monomers were vented. The fluorocarbon elastomer copolymer is isolated from the emulsion by first diluting it with deionized water at the rate of 8 liter deionized water per liter of emulsion, followed by addition of 640 cubic centimeters of a magnesium sulfate solution (100 g magnesium sulfate heptahydrate per liter of deionized water) per liter of emulsion at a temperature of 60° C. The resulting slurry is filtered, and the polymer solids obtained from a liter of emulsion are re-dispersed in 8 liters of deionized water at 60° C. After filtering, the wet crumb is dried in a forced air oven for 48 hours at 70° C. The yield of fluoroelastomer copolymer is 82.5 g per hour of reactor operation. The copolymer composition is 46.7 wt. % PMVE, 3.04 wt. % 8CNVE, the remainder being TFE. The copolymer has an inherent viscosity of 0.91 measured in a solution of 0.1 g copolymer in 100 g of Flutec® PP-11 (F2 Chemicals Ltd., Preston, UK).

Comparative Example 11

The general process described in the above example to produce a fluorocarbon elastomer copolymer of TFE, PMVE and 8CNVE is repeated except that DA was used alone without PFPEA 2.

Three aqueous streams are each fed continuously to a 1 liter mechanically stirred, water jacketed, stainless steel autoclave at a rate of 81 cubic centimeters/hour. The first stream consists of 35.4 g ammonium persulfate in 3 liters of deionized water. The second consists of 240 g of the DA in 4 liter of deionized water. The third stream consists of 29.8 g of sodium hydroxide and 29.3 g sodium sulfite in 3 liters of deionized water. Using a diaphragm compressor, a mixture of TFE (61.7 g/hour) and PMVE (51.8 g/hour) was fed at constant rate. The liquid monomer, 8CNVE, was fed separately at a rate of 3.1 g/hour. The temperature is maintained at 75° C., the pressure at 4.1 MPa (600 psi), and the pH at 8.9 throughout the reaction. The copolymer emulsion is removed continuously by means of a letdown valve and the unreacted monomers were vented. Overall, the polymerization runs poorly. Maximum emulsion copolymer solids only reaches approximately 2 wt %. The emulsion produced is unstable, and most of the fluorocarbon elastomer copolymer that is produced coagulates and deposits in the reactor.

The small amount of copolymer recovered is hard and brittle and is not analyzable by standard methods.

Examples 16-19, Comparative Examples 12-14

The process of the invention is illustrated in the polymerization of melt-processible copolymers of tetrafluoroethylene (TFE) with perfluoro(alkyl vinyl ether), i.e., perfluoro (propyl vinyl ether) (PPVE). Three short chain fluorosurfactants as indicated in Table 6A are employed in a polymerization agent combination with PFPEA 2 and compared to the short chain fluorosurfactants used alone as a polymerization surfactant. Table 6B summarizes the results.

TABLE 6A

TFE/PPVE Polymerization

| Example | Surfactant | g | ppm | PFPEA g | ppm | APS g | Ethane g | Total Monomer g |
|---|---|---|---|---|---|---|---|---|
| Ex. 16 | $C_3F_7OCF_2CF_2COONH_4$ | 4.01 | 568 | 1 | 142 | 0.516 | 0.5 | 2511 |
| Comp. 12 | $C_3F_7OCF_2CF_2COONH_4$ | 5 | 709 | 0 | 0 | 0.549 | 0.5 | 2519 |
| Ex. 17 | $C_2F_5OCF(CF_3)COONH_4$ | 15 | 2064 | 3.75 | 573 | 0.620 | 0.5 | 1818 |
| Ex. 18 | $C_2F_5OCF(CF_3)COONH_4$ | 12 | 1701 | 3 | 425 | 0.589 | 0.5 | 1834 |
| Comp. 13 | $C_2F_5OCF(CF_3)COONH_4$ | 15 | 2127 | 0 | 0 | 0.455 | 0.5 | 1752 |
| Ex. 19 | $C_4F_9CH_2CH_2SO_3H$ | 13.6 | 1914 | 3.4 | 478 | 0.607 | 0.5 | 3651 |
| Comp. 14 | $C_4F_9CH_2CH_2SO_3H$ | 17 | 2378 | 0 | 0 | 0.751 | 0.5 | 3693 |

TABLE 6B

TFE/PPVE Polymerization

| Example | Kick-off (min.) | Completion Time (min.) | Solids wt % | M. Pt. (° C.) | PPVE wt % | MFR | Undispersed Polymer (g) | wt % |
|---|---|---|---|---|---|---|---|---|
| Ex. 16 | 2 | 74 | 24.2 | 310.1 | 3.72 | 9.9 | 0.81 | 0.04 |
| Comp. 12 | 1 | 96 | 20.6 | 311.9 | 3.58 | 7.0 | 177 | 8.9 |
| Ex. 17 | 4 | 95 | 12.8 | 307.3 | 4.7 | 35.4 | 0 | 0 |
| Ex. 18 | 4 | 83 | 15.0 | 308.2 | 4.58 | 38.9 | 0 | 0 |
| Comp. 13 | 2 | 70 | 12.2 | 311.6 | 3.28 | 4.2 | 80 | 7.7 |
| Ex. 19 | 2 | 117 | 30.0 | 309 | 4.34 | 29.7 | 36 | 1.2 |
| Comp. 14 | 3 | 134 | 25.5 | 309.8 | 4.23 | 4.24 | 900 | 28 |

Example 16

Polymerization agent for this example is prepared as a concentrate by adding 4.01 g of $C_3F_7OCF_2CF_2COONH_4$ to 16.04 g of deionized water in a vial and shaking the vial until the mixture is clear. PFPEA 2 (1 g) is added and then 6 drops of 30 wt % ammonium hydroxide. The vial is again shaken to give a clear to slightly hazy mixture. This mixture is added to 900 ml of deionized water with agitation to give a clear (haze less than about 3%) polymerization agent concentrate of pH 8.

Following the general procedure of Examples 1-3, 900 ml the above polymerization agent concentrate is added dropwise with agitation to 6100 g of deaerated deionized water in a 3 gallon (11 liter) horizontal autoclave. Ethane, 0.5 g, and perfluoro(propyl vinyl ether) (PPVE), 68 ml (104 g) and are added. The autoclave is heated to 75° C. and agitation is begun (70 rpm). The autoclave is pressured to 300 psig (2.17 MPa) with tetrafluoroethylene (TFE). Ammonium persulfate (APS) initiator (48 ml of a 6.2 g/1000 ml water solution) is added initially and then 0.54 ml/min of APS initiator solution (6.2 g/1000 ml) is added until the end of polymerization. Table 6A shows the concentration of polymerization agent components in the water at the start of polymerization. Polymerization is recorded as beginning when TFE pressure drops 10 psi (70 kPa), this point being identified as kick-off. After kick-off TFE is fed to maintain the autoclave pressure at 300 psig (2.17 MPa), and PPVE is fed at the rate of 42 ml/hour. After 10 minutes PPVE feed is increased to 55 ml/hour. When the total monomers, including the monomer added before kick-off, stated in Table 6A is added, polymerization is stopped and the autoclave is vented. Polymer dispersion is drained from the autoclave, weighed, its percent solids is measured, then it is filtered to remove coagulated (undispersed) solids, and then frozen and thawed to coagulate the dispersed polymer. The coagulate is dried overnight in a vacuum over at 100-110° C. at 6-10 mm Hg (0.8-1.3 kPa). Melt flow rate, melting point, and PPVE content are measured. Results are summarized in Table 6B.

Comparative Example 12

This Example is like Example 16 except that a polymerization surfactant solution is made by adding 6.0 g of $C_3F_7OCF_2CF_2COONH_4$ to 900 ml of deionized water with mixing. The resulting mixture is clear with a pH of 7. No PFPEA 2 is added. Except that the PPVE feed is not increased during polymerization, polymerization and polymer isolation is as described in Example 16. Results are summarized in Tables 6A and 6B. In comparison to Example 16, which has very little undispersed polymer, 8.9% of the polymer made in this Example is undispersed, showing that $C_3F_7OCF_2CF_2COONH_4$ alone is a poor surfactant, though it performs well in combination with PFPEA 2.

Example 17

Polymerization agent for this Example is prepared by:

a) adding 1.3 g PFPEA 2, 1.75 g t-butanol, 2.06 g deionized water, and 0.2 g 30 wt % ammonium hydroxide in a vial. After shaking, the mixture is clear. The mixture is added dropwise to 510 g deionized water with mixing. The resulting mixture, Mixture A, is clear, with a pH of 9.

b) $C_2F_5OCF(CF_3)COOH$, 5.2 g is placed in a vial and 3.0 g of 30 wt % ammonium hydroxide is added. The capped vial is shaken under running cold water to remove the heat of neutralization. The resulting mixture is clear. It is added to Mixture A. The resulting mixture, Mixture B, remains clear. It has a pH of 10.

c) In order, PFPEA 2, 2.45 g, 3.3 g t-butanol, 3.88 g deionized water, and 0.47 g 30 wt % ammonium hydroxide are added to a vial, which is capped and shaken until the contents are a single phase and clear. This mixture is added dropwise with vigorous agitation to 500 ml of deionized water. The resulting mixture is clear, with a pH of 10. This is Mixture C.

d) $C_2F_5OCF(CF_3)COOH$, 9.8 g, is added to a vial, after which 3.53 g of 30 wt % ammonium hydroxide is also added. The capped vial is shaken under running cold water to remove the heat of neutralization. The resulting mixture is clear. This mixture is added dropwise with vigorous mixing to Mixture C, giving Mixture D, which is clear and has a pH of 9.5.

Mixtures B and D are then mixed together to produce Mixture BD which is clear (haze less than about 3%).

The polymerization procedure of Example 16 is followed using Mixture BD as the polymerization agent concentrate. The results are summarized in Tables 6A and 6B.

Example 18

Polymerization agent for this Example is prepared by adding to a vial in order: 3.0 grams of Krytox® FSL, 4.0 grams of t-butanol and 4.75 grams of DI water. This is capped and shaken vigorously to produce a milky mixture. 0.5 grams of 30 wt % ammonium hydroxide is added to the vial and again the vial was capped and shaken to produce a foamy mixture which upon standing became a water clear single phase. The contents of this vial is added slowly to 900 grams of deionized, deaerated water while stirring vigorously. The resulting mixture is water clear.

To a second vial is added 12 grams of $C_2F_5OCF(CF_3)COOH$. To this is added 4.3 grams of 30 wt % ammonium hydroxide. The vial is capped and shaken under running cold water to remove the heat of reaction. The resulting mixture is water clear. The contents of this second vial are also added slowly to the above Krytox mixture while agitating vigorously. The resulting polymerization agent concentrate is water clear (haze less than about 3%) with a pH 9.5 as measured by pH paper.

The polymerization procedure of Example 16 is followed. The results are summarized in Tables 6A and 6B.

Comparative Example 13

Polymerization agent for this Example is prepared by adding 15 g of $C_2F_5OCF(CF_3)COOH$ and 5 g of 30 wt % ammonium hydroxide. The vial is capped and shaken under running cold water to remove the heat of reaction. The resulting mixture is water clear. It is added dropwise with stirring to 900 ml of deionized water, producing a slightly hazy solution of pH 8.5. Nine drops of 30 wt % ammonium hydroxide brings the pH to 9.5. The mixture is still slightly hazy.

The polymerization procedure of Example 16 is followed. The results are summarized in Tables 6A and 6B. In comparison to Examples 17 and 18, which differ in having PFPEA 2 included in the polymerization agent, this Comparative Example 13 makes dispersion containing 7.7% undispersed polymer. Examples 17 and 18 produced no undispersed polymer.

Example 19

Polymerization agent is prepared by adding 13.6 grams of $C_4F_9CH_2CH_2SO_3Na$ (FORAFAC™ 42) to 900 gm of deionized, deaerated water. This is stirred via magnetic stir plate until the solid is completely dissolved. The resulting mixture is water clear with pH=9.5.

In a vial is added 3.4 grams of PFPEA 2, 4.53 grams t-butanol and 5.41 grams of deionized water. The vial is capped and shaken to produce a milky dispersion. To this is added 0.58 grams of a 30 wt % ammonium hydroxide. The vial is again capped and vigorously shaken to produce a foamy mixture. Upon standing, the contents form a water clear single phase. The vial contents are added to the above 913.6 gram mixture of $C_4F_9CH_2CH_2SO_3Na$ through a pipette which is immersed under the surface of the clear liquid and into the high shear region created by vigorously stirring the mixture on a magnetic stir plate. Once all of the vial contents are added, the polymerization agent concentrate is water clear (haze less than about 3%) with a pH=10.5 as measured with pH paper.

The polymerization procedure of Example 16 is followed except that 6200 g of deaerated water is used. The results are summarized in Tables 6A and 6B.

Comparative Example 14

Polymerization surfactant solution for this Example is prepared by adding 17 grams of $C_4F_9CH_2CH_2SO_3Na$ (FORAFAC™ 42) to 900 gm of deionized, deaerated water. This is stirred via magnetic stir plate until the solid is completely dissolved. The resulting mixture is water clear with pH=9.5.

The polymerization procedure of Example 16 is followed except that 6200 g of deaerated water is used. The results are summarized in Tables 6A and 6B. In comparison to Example 19, in which $C_4F_9CH_2CH_2SO_3Na$ is combined with PFPEA 2 as a polymerization agent in the polymerization, which gives only about 1% undispersed polymer, $C_4F_9CH_2CH_2SO_3Na$ alone as polymerization surfactant gives a polymer dispersion containing 30% undispersed polymer.

What is claimed is:

1. A process comprising polymerizing at least one fluorinated monomer in an aqueous medium containing initiator and polymerization agent to form an aqueous dispersion of particles of fluoropolymer, said polymerization agent comprising:

fluoropolyether acid or salt thereof having a number average molecular weight of at least about 800 g/mol; and fluorosurfactant having the formula:

[$R^1-O_n$-L-A$^-$]Y$^+$ wherein:
R¹ is a linear or branched partially or fully fluorinated aliphatic group which may contain ether linkages;
n is 1;
L is a linear or branched alkylene group which may be non-fluorinated, partially fluorinated or fully fluorinated and which may contain ether linkages;
A⁻ is a carboxylate; and
Y⁺ is hydrogen, ammonium or alkali metal cation;
with the proviso that the chain length of R¹—O$_n$-L- is not greater than 6 atoms,
wherein said polymerization agent comprises a minor amount of said fluoropolyether acid or salt thereof and a major amount of said fluorosurfactant;
wherein said polymerizing produces less than about 3 wt % undispersed fluoropolymer based on the total weight of fluoropolymer produced; and
said process further comprising forming a mixture of a polymerization agent comprising a fluoropolyether acid or salt in acid form and a fluorosurfactant in acid form and dispersing said mixture in an aqueous medium.

2. The process of claim 1 wherein said chain length of R¹-0n-L- is 3 to 6 atoms.

3. The process of claim 1 wherein said chain length of R¹-0n-L- is 4 to 6 atoms.

4. The process of claim 1 wherein said chain length of R¹-0n-L- is 3 to 5 atoms.

5. The process of claim 1 wherein said chain length of R¹-0n-L- is 4 to 5 atoms.

6. The process of claim 1 wherein:
R¹ is a linear or branched partially or fully fluorinated alkyl group having 1 to 3 carbon atoms which may contain ether linkages; and
L is an alkylene group selected from —CX(R²)—, wherein R² is fluorine or perfluoromethyl and X is hydrogen or fluorine, and —CZ¹Z²CZ³Z⁴—, wherein Z¹, Z², Z³, and Z⁴ are independently selected from the group consisting of hydrogen and fluorine.

7. The process of claim 6 wherein:
L is an alkylene group selected from the group consisting of —CF(CF₃)—, —CF₂—, —CF₂CF₂—, —CHFCF₂—, and —F₂CHF—.

8. The process of claim 1 wherein R¹ is a linear partially or fully fluorinated alkyl group having 2 to 3 carbon atoms.

9. The process of claim 1 wherein R¹ is fully fluorinated.

10. The process of claim 1 wherein:
R¹ is CF₃CF₂CF₂—,
L is —CF(CF₃)—; and
Y⁺ is hydrogen or ammonium.

11. The process of claim 1 wherein said aqueous medium contains less than about 300 ppm of perfluoroalkane carboxylic acid or salt fluorosurfactant having 8 or more carbon atoms based on the weight of water in said aqueous medium.

12. The process of claim 1 wherein said fluoropolyether acid or salt thereof having a number average molecular weight of at least about 800 g/mol comprises acid groups selected from carboxylic acid, sulfonic acid, sulfonamide, phosphonic acid.

13. The process of claim 1 wherein said fluoropolyether acid or salt thereof has a number average molecular weight of about 800 to about 3500 g/mol.

14. The process of claim 1 wherein said fluoropolyether acid or salt thereof has a number average molecular weight of about 1000 to about 2500 g/mol.

15. The process of claim 1 wherein said polymerization agent is present in said aqueous medium in an amount of about 5 ppm to about 3000 ppm based on the weight of water in said aqueous medium.

16. The process of claim 1 wherein said aqueous dispersion of particles of fluoropolymer formed by said process has a fluoropolymer solids content of about 20 wt % to about 65 wt %.

17. The process of claim 1 wherein said at least one fluorinated monomer is selected from the group consisting of tetrafluoroethylene (TFE), hexafluoropropylene (HFP), chlorotrifluoroethylene (CTFE), trifluoroethylene, hexafluoroisobutylene, perfluoroalkyl ethylenes, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether).

18. The process of claim 1 wherein said particles of fluoropolymer produced comprise PTFE or modified PTFE having a comonomer content of no greater than about 1 wt %.

19. The process of claim 1 wherein said fluorosurfactant comprises at least about 55 wt % of said polymerization agent.

20. The process of claim 1 wherein said fluorosurfactant comprises at least about 65 wt % of said polymerization agent.

21. The process of claim 1 wherein said particles of fluoropolymer produced comprise a melt-processible copolymer comprising at least about 60-98 wt % tetrafluoroethylene units and about 2-40 wt % of at least one other monomer.

22. The process of claim 1 wherein said aqueous medium is substantially free of perfluoropolyether oil.

23. The process of claim 1 wherein said polymerization medium is substantially free of fluoropolymer seed at polymerization kick-off.

24. The process of claim 1 wherein L contains at least one ether linkage.

25. A process comprising polymerizing at least one fluorinated monomer in an aqueous medium containing initiator and polymerization agent to form an aqueous dispersion of particles of fluoropolymer, said polymerization agent comprising:
fluoropolyether acid or salt thereof having a number average molecular weight of at least about 800 g/mol; and
fluorosurfactant having the formula:

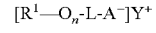

[R¹—O$_n$-L-A⁻]Y⁺ wherein:
R¹ is a linear or branched partially or fully fluorinated aliphatic group which may contain ether linkages;
n is 1;
L is a linear or branched alkylene group which may be non-fluorinated, partially fluorinated or fully fluorinated and which contains at least one ether linkage;
A⁻ is a carboxylate; and
Y⁺ is hydrogen, ammonium or alkali metal cation;
with the proviso that the chain length of R¹—O$_n$-L- is not greater than 6 atoms,
wherein said polymerization agent comprises a minor amount of said fluoropolyether acid or salt thereof and a major amount of said fluorosurfactant; and
wherein said polymerizing produces less than about 3 wt % undispersed fluoropolymer based on the total weight of fluoropolymer produced.

26. The process of claim 25 wherein $R^1$ is a linear partially or fully fluorinated alkyl group having 2 to 3 carbon atoms.

27. The process of claim 25 wherein $R^1$ is fully fluorinated.

28. The process of claim 25 wherein said aqueous medium contains less than about 300 ppm of perfluoroalkane carboxylic acid or salt fluorosurfactant having 8 or more carbon atoms based on the weight of water in said aqueous medium.

29. The process of claim 25 wherein said fluoropolyether acid or salt thereof having a number average molecular weight of at least about 800 g/mol comprises acid groups selected from carboxylic acid, sulfonic acid, sulfonamide, phosphonic acid.

30. The process of claim 25 wherein said fluoropolyether acid or salt thereof has a number average molecular weight of about 800 to about 3500 g/mol.

31. The process of claim 25 wherein said fluoropolyether acid or salt thereof has a number average molecular weight of about 1000 to about 2500 g/mol.

32. The process of claim 25 wherein said polymerization agent is present in said aqueous medium in an amount of about 5 ppm to about 3000 ppm based on the weight of water in said aqueous medium.

33. The process of claim 25 wherein said aqueous dispersion of particles of fluoropolymer formed by said process has a fluoropolymer solids content of about 20 wt % to about 65 wt %.

34. The process of claim 25 wherein said at least one fluorinated monomer is selected from the group consisting of tetrafluoroethylene (TFE), hexafluoropropylene (HFP), chlorotrifluoroethylene (CTFE), trifluoroethylene, hexafluoroisobutylene, perfluoroalkyl ethylenes, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether).

35. The process of claim 25 wherein said particles of fluoropolymer produced comprise PTFE or modified PTFE having a comonomer content of no greater than about 1 wt %.

36. The process of claim 25 wherein said fluorosurfactant comprises at least about 55 wt % of said polymerization agent.

37. The process of claim 25 wherein said fluorosurfactant comprises at least about 65 wt % of said polymerization agent.

38. The process of claim 25 wherein said particles of fluoropolymer produced comprise a melt-processible copolymer comprising at least about 60-98 wt % tetrafluoroethylene units and about 2-40 wt % of at least one other monomer.

39. The process of claim 25 wherein said aqueous medium is substantially free of perfluoropolyether oil.

40. The process of claim 25 wherein said polymerization medium is substantially free of fluoropolymer seed at polymerization kick-off.

41. The process of claim 25 wherein said chain length of $R^1$—$O_n$-L- is 4 to 5 atoms.

* * * * *